United States Patent [19]

Hirano et al.

[11] Patent Number: 5,161,637

[45] Date of Patent: *Nov. 10, 1992

[54] FINAL DRIVE SUSPENSION SYSTEM

[75] Inventors: Yoshinori Hirano, Yokohama; Yasushi Fujita, Yokosuka, both of Japan; Hiroshi Okuzumi, Ithaca, N.Y.

[73] Assignee: Nissan Motor Co., Ltd., Yokohama, Japan

[*] Notice: The portion of the term of this patent subsequent to Mar. 31, 2009, has been disclaimed.

[21] Appl. No.: 617,099

[22] Filed: Nov. 23, 1990

Related U.S. Application Data

[63] Continuation-in-part of Ser. No. 559,942, Jul. 31, 1990, Pat. No. 5,099,946.

[30] Foreign Application Priority Data

Jul. 31, 1989 [JP] Japan .................. H99116
Jul. 30, 1990 [JP] Japan .................. 2-201801

[51] Int. Cl.$^5$ .............................. B60R 17/16
[52] U.S. Cl. ............................ 180/360; 180/378
[58] Field of Search ............ 180/359, 360, 361, 374, 180/377, 378, 382; 267/292

[56] References Cited

U.S. PATENT DOCUMENTS

| 4,432,428 | 2/1984 | Kondo et al. | 180/73 |
| 4,699,230 | 10/1987 | Solleder et al. | 180/360 |
| 4,815,556 | 3/1989 | Sumimoto et al. | 267/292 X |
| 4,889,207 | 12/1989 | von Broock | 180/291 |

FOREIGN PATENT DOCUMENTS

| 917767 | 9/1954 | Fed. Rep. of Germany. | |
| 1222808 | 8/1966 | Fed. Rep. of Germany | 180/360 |
| 3207035 | 9/1982 | Fed. Rep. of Germany. | |
| 3218831 | 11/1983 | Fed. Rep. of Germany. | |
| 3637522 | 1/1988 | Fed. Rep. of Germany | 180/375 |
| 31823 | 2/1988 | Japan | 180/378 |
| 305596 | 5/1955 | Switzerland | 180/360 |
| 752749 | 7/1956 | United Kingdom | 180/360 |

OTHER PUBLICATIONS

Japanese Patent Abstract of JP-A-63 240414 dated Oct. 6, 1988.

Primary Examiner—Charles A. Marmor
Assistant Examiner—Tamara L. Graysay
Attorney, Agent, or Firm—Foley & Lardner

[57] ABSTRACT

A suspension system for suspending a final drive unit installed on an automotive vehicle. The final drive unit including a drive shaft drivingly coupled to a cardan shaft, and output shaft drivingly coupled to road wheels for transmitting a drive from the cardan shaft to the road wheels. The drive shaft has an axis extending longitudinally of the vehicle. The output shafts have an axis extending transversely of the vehicle. The final drive unit is subject to reaction torques causing the final drive unit to make a rolling angular displacement around the drive shaft axis and reaction torques causing the final drive unit to make a pitching angular displacement around the output shaft axis during vehicle driving. The suspension system includes elastic suspension elements for elastically flexibly suspending the final drive unit, with respect to the vehicle, at suspension points located at different positions to reduce the pitching angular displacement substantially to zero.

30 Claims, 7 Drawing Sheets

FIG.3 (a) FIG.3 (b) FIG.3 (c) FIG.3 (d)
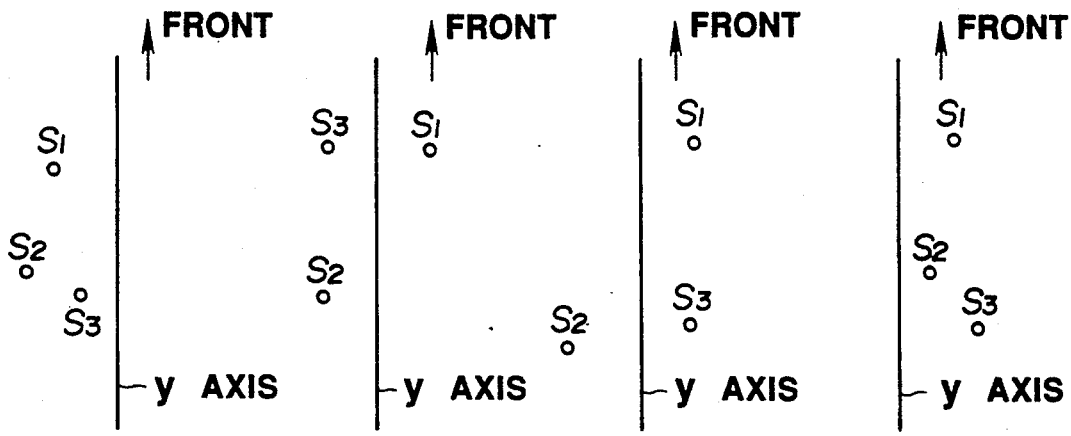
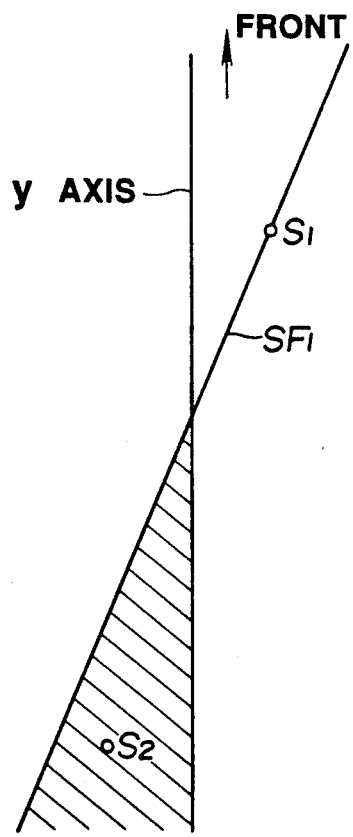
FIG.4(a)
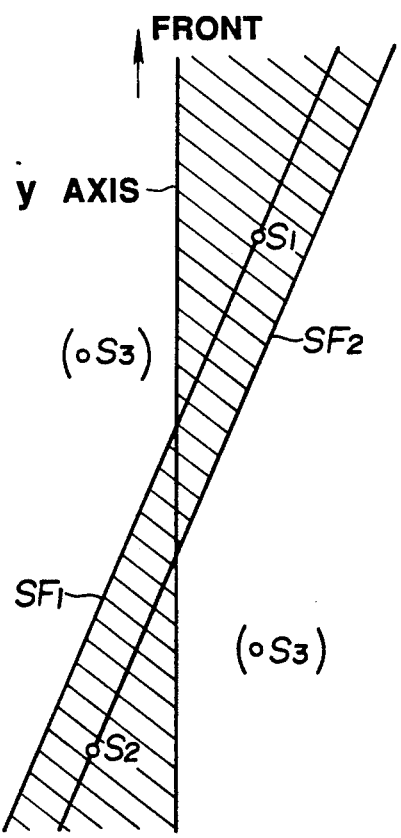
FIG.4(b)

FINAL DRIVE SUSPENSION SYSTEM

This application is a continuation-in-part of application Ser. No. 07/0559,942, filed Jul. 31, 1990, now U.S. Pat. No. 5,099,946, issued Mar. 31, 1992.

BACKGROUND OF THE INVENTION

This invention relates to a final drive suspension system for a vehicle.

Final drives have been provided in motor vehicles for transmitting the drive from a cardan shaft to an axle shaft having driving wheels secured thereon. The final drive has a bevel pinion integral with a drive shaft coupled through a cardan joint to the cardan shaft. The bevel pinion meshes with a bevel wheel for turning the drive round through 90 degrees and reducing the drive in speed. During vehicle driving, the final drive is subject to torques of reaction around the axis of the cardan shaft (cardan shaft moment) and also around axis of the axle shaft (starting moment). For this reason, the final drive should be suspended elastically at the floor or the vehicle in order to reduce vibrations and noises which would be transmitted to the vehicle if it is mounted rigidity at the floor of the vehicle. However, it is impossible to nullify final drive motions merely by elastically suspending the final drive at the floor of the vehicle.

Various approaches have been proposed to reduce vibrations transmitted from the final drive to the cardan shaft. For example, U.S. Pat. No. 4,699,230 describes an axle gear casing suspension system for elastically flexibly suspending a rear axle gear casing at least two suspension points. One of the suspension points is shifted from a torque support plane determined by the other suspension point so that swivel motions of the same magnitude are produced in opposite directions at a connection point between the cardan shaft and the drive shaft. This is effective to reduce changes in the position of the connection point which is subject to the influence of the starting and cardan shaft moments.

With such a conventional suspension system, however, it is impossible to hold the drive shaft in its original position under the influence of the starting and cardan shaft moments. Particularly when a universal joint, such as cardan joint, is used to couple the cardan joint to the drive shaft, a secondary moment, which corresponds to the joint angle between the cardan shaft and the drive shaft, will occur to produce vibrations and noises. The vibrations and noises will increase as the angle of the drive shaft with respect to the cardan shaft changes because of changes in the position of the final drive.

SUMMARY OF THE INVENTION

Therefore, it is a main object of the invention to provide an improved final drive suspension system which can minimize the change in the position of the drive shaft drivingly coupled to the cardan shaft.

Another object of the invention is to provide an improved final drive suspension system which can minimize the angular displacement of the drive shaft with respect to the cardan shaft.

There is provided, in accordance with the invention, a suspension system for suspending a final drive unit installed on an automotive vehicle comprising road wheels and a cardan shaft. The final drive unit includes a drive shaft drivingly coupled to the cardan shaft, and output shafts drivingly coupled to the respective road wheels for transmitting a drive from the cardan shaft to the road wheels. The drive shaft has an axis extending longitudinally of the vehicle. The output shafts have an axis extending transversely of the vehicle. The final drive unit is subject to reaction torques causing the final drive unit to make a rolling angular displacement around the drive shaft axis and reaction torques causing the final drive unit to make a pitching angular displacement around the output shaft axis during vehicle driving. The suspension system includes elastic suspension means for elastically flexibly suspending the final drive unit, with respect to the vehicle, at suspension points located at different positions to reduce the pitching angular displacement substantially to zero.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels. The suspension system includes elastic suspension means for elastically flexibly suspending the final drive unit, with respect to the vehicle, at first, second and third suspension points. The second suspension point is located behind the first suspension point and in an acute-angled zone made between a first resultant torque supporting plane and an axle plane. The first resultant torque supporting plane expands through the first suspension point and normal to a resultant torque vector of the reaction torques around the drive shaft axis and the reaction torques around the output shaft axis. The axle plane expands normal to the output shaft axis and including a rolling axis. The rolling axis extends between the first and second suspension points and parallel with the drive shaft axis. The third suspension point is located on a side opposite from the second suspension point with respect to the first resultant torque supporting plane and on the same side as the second suspension point with respect to the axle plane.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels. The suspension system includes elastic suspension means for elastically flexibly suspending the final drive unit, with respect to the vehicle, at first, second and third suspension points. The second suspension point is located behind the first suspension point and in an acute-angled zone made between a first resultant torque supporting plane and an axle plane. The first resultant torque supporting plane expands through the first suspension point and normal to a resultant torque vector of the reaction torques around the drive shaft axis and the reaction torques around the output shaft axis. The axle plane expands normal to the output shaft axis and includes a rolling axis. The rolling axis extends between the first and second suspension points and parallel with the drive shaft axis. The third suspension point is located on a side opposite from the first suspension point with respect to a second resultant torque supporting plane and on the same side as the first suspension point with respect to the axle plane. The second resultant torque supporting plane expands through the second suspension point and normal to the resultant torque vector.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first suspension point is located in front of the output shaft axis. The second suspension point is located behind the output shaft axis. The third suspension point is located on a side opposite from the bevel wheel with respect to the drive shaft axis. The second suspension point is located on the same side as the bevel wheel with respect to the drive shaft axis. The elastic suspension means has rigidities k1, k2 and k3 at the first, second and third suspension points, respectively. The first suspension point is located at a transverse distance of e1 from the third suspension point. The third suspension point is located at a transverse distance e2 from the drive shaft axis. The second suspension point is located at a transverse distance e from the third suspension point. The first suspension point is located at a longitudinal distance d from the second suspension point. The first suspension point is located at a longitudinal distance d2 from the third suspension point. The rigidities k1, k2 and k3 are determined by $$\frac{k3}{k1} = \left(1 - \frac{e1}{e2}\right) \cdot \frac{-\zeta 2 + \zeta 2 \cdot e1/e + d/e}{\zeta 2 + d2/e - d/e}$$

$$\frac{k3}{k2} = \left(1 - \frac{e}{e2}\right) \cdot \frac{\zeta 2 - \zeta 2 \cdot e1/e - d/e}{\zeta 2 \cdot e1/e + d2/e}$$

where $\zeta 2$ is a ratio TP/TR of the reaction torque TP around the output shaft axis to the reaction torque TR around the drive shaft axis.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first suspension point is located in front of the output shaft axis. The second and third suspension points are located behind the output shaft axis. The first and third suspension points are located on a side opposite from the bevel wheel with respect to the drive shaft axis. The second suspension point is located on the same side as the bevel wheel with respect to the drive shaft axis. The elastic suspension means has rigidities k1, k2 and k3 at first, second and third suspension points, respectively. The rigidity k3 is less than the rigidities k1 and k2.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first and third suspension points are located in front of the output shaft axis. The second suspension point is located behind the output shaft axis. The third suspension point is located on a side opposite from the bevel wheel with respect to the drive shaft axis. The first and second suspension points are located on the same side as the bevel wheel with respect to the drive shaft axis. The elastic suspension means has rigidities k1, k2 and k3 at first, second and third suspension points, respectively. The rigidity k1 is less than the rigidities k2 and k3.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first and third suspension points are located in front of the output shaft axis. The second suspension point is located behind the output shaft axis. The first and third suspension points are located on a side opposite from the bevel wheel with respect to the drive shaft axis. The second suspension point is located on the same side as the bevel wheel with respect to the drive shaft axis. A transverse distance between the first and third suspension points is zero. The elastic suspension means has rigidities k1, k2 and k3 at first, second and third suspension points, respectively. The rigidities k1 and k3 are less than the rigidity k2.

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first suspension point is located in front of the output shaft axis. The second suspension point is located behind the output shaft axis. The third suspension point is located on a side opposite from the bevel wheel with respect to the drive shaft axis. The second suspension point is located on the same side as the bevel wheel with respect to the drive shaft axis. The elastic suspension means has rigidities k1, k2 and k3 at the first, second and third suspension points, respectively. The final drive unit has a reduction ratio of $\zeta$. The first suspension point is located at a transverse distance of e1 from the third suspension point. The third suspension point is located at a transverse distance e2 from the drive shaft axis. The second suspension point is located at a transverse distance e from the third suspension point. The first suspension point is located at a longitudinal distance d from the second suspension point. The first suspension point is located at a longitudinal distance d2 from the third suspension point. The rigidities k1, k2 and k3 are determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first suspension point is located in front of the output shaft axis. The second and third suspension points are located behind the output shaft axis. The first and third suspension points are located on a side opposite from the bevel wheel with respect to the drive shaft axis. The second suspension point is located on the same side as the bevel wheel with respect to the drive shaft axis. The elastic suspension means has rigidities k1, k2 and k3 at first, second and third suspension points, respectively. The final drive unit has a reduction ratio of $\zeta$. The first suspension point is located at a transverse distance of e1 from the third suspension point. The third suspension point is located at a transverse distance e2 from the drive shaft axis. The second suspension point is located at a transverse distance e from the third suspension point. The first suspension point is located at a longitudinal distance d from the second suspension point. The first suspension point is located at a longitudinal distance d2 from the third suspension point. The rigidities k1, k2 and k3 are determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first and third suspension points are located in front of the output shaft axis. The second suspension point is located behind the output shaft axis. The third suspension point is located on a side opposite from the bevel wheel with respect to the drive shaft axis. The first and second suspension points are located on the same side as the bevel wheel with respect to the drive shaft axis. The elastic suspension means has rigidities k1, k2 and k3 at first, second and third suspension points, respectively. The final drive unit has a reduction ratio of $\zeta$. The first suspension point is located at a transverse distance of e1 from the third suspension point. The third suspension point is located at a transverse distance e2 from the drive shaft axis. The second suspension point is located at a transverse distance e from the third suspension point. The first suspension point is located at a longitudinal distance d from the second suspension point. The first suspension point is located at a longitudinal distance d2 from the third suspension point. The rigidities k1, k2 and k3 are determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

In another aspect of the invention, there is provided a suspension system for suspending a final drive unit installed on an automotive vehicle comprising road wheels and a cardan shaft. The final drive unit includes a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels. The suspension system includes elastic suspension means for elastically flexibly suspending the final drive unit, with respect to the vehicle, at first, second and third suspension points. The first and third suspension points are located in front of the output shaft axis. The second suspension point is located behind the output shaft axis. The first and third suspension points are located on a side opposite from the bevel wheel with respect to the drive shaft axis. The second suspension point is located on the same side as the bevel wheel with respect to the drive shaft axis. A transverse distance between the first and third suspension points is zero. The elastic suspension means has rigidities k1, k2 and k3 at first, second and third suspension points, respectively. The final drive unit having a reduction ratio of $\zeta$. The first suspension point is located at a transverse distance of e1 from the third suspension point. The third suspension point is located at a transverse distance e2 from the drive shaft axis. The second suspension point is located at a transverse distance e from the third suspension point. The first suspension point is located at a longitudinal distance d from the second suspension point. The first suspension point is located at a longitudinal distance d2 from the third suspension point. The rigidities k1, k2 and k3 are determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

BRIEF DESCRIPTION OF THE DRAWINGS

This invention will be described in greater detail by reference to the following description taken in connection with the accompanying drawings, in which:

FIGS. 1 to 5 are diagrams used in explaining a first approach made in the invention;

DETAILED DESCRIPTION OF THE INVENTION

Prior to the description of the preferred embodiments of the present invention, the principles of the invention will be described in order to provide a basis for a better understanding of the invention.

Figure 1:
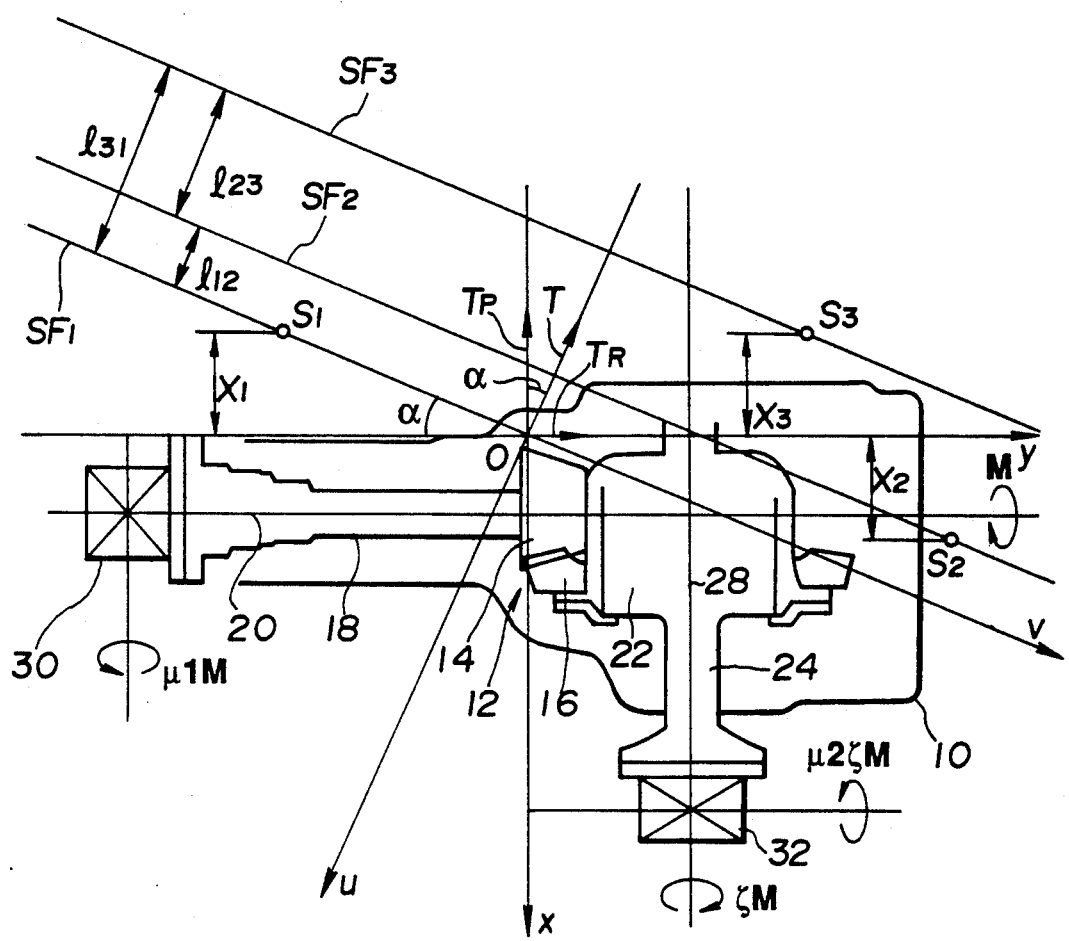

Description will be made to a first approach made in the invention with reference to FIGS. 1 to 5. FIG. 1 shows a final drive unit including an axle gear casing 10 which contains a final drive 12 and a differential 22. The final drive 12 is shown as including a bevel pinion 14 meshed with a bevel wheel 16 having a diameter greater than the diameter of the bevel pinion 14. The bevel pinion 14 is integral with a drive shaft 18 which extends outward through the front end of the axle gear casing 10 and terminates at its front end in a disc flange for connection through a cardan joint 30 to a cardan or propeller shaft. The drive shaft 18 has an axis 20 extending in the direction of the length of the vehicle. The differential 22 has two output shafts 24, the axis 28 of which extends in the direction of the width of the vehicle. Each of the output shafts 24 extends through the axle gear casing 10 and terminates at its outer end in a disc flange for connection through a universal joint 32 to the corresponding one of the road wheels of the vehicle. From the engine the drive is transmitted through a clutch and a gear box to the cardan shaft having a universal joint at each end. It is then taken by the drive shaft 18 to the final drive 12. The final drive 12 turns the drive round through 90 degrees and reduces the speed in a selected ratio. The differential 22 divides it equally between the two output shafts 24 which are connected through the universal joints 32 to the respective road wheels.

The axle gear casing 10 is suspended elastically flexibly at the floor of the vehicle body through three elastic suspension elements located at suspension points S1, S2 and S3. Assuming now that M is the reaction torque created around the drive shaft axis 20 (cardan shaft moment) when the vehicle is moves in the forward direction with the final drive 12 having a reduction ratio of $\zeta$, the reaction torque produced around the axle shaft axis 28 (starting moment) is $\zeta \cdot M$.

When the final drive 12 is subject to a rolling moment under the influence of the cardan shaft moment M around the drive shaft axis 20, the universal joint 32 works at an angular deflection turning the output shaft 24 out of alignment with the road wheel axle. The starting moment $\zeta \cdot M$ is exerted on the universal joint 32 to produce a friction torque in the direction opposite to the direction of the cardan shaft moment M; that is, in the direction reducing the angular deflection to return the output shaft 24 into alignment with the road wheel axle.

This friction torque is represented as $\mu_2 \cdot \zeta \cdot M$ where $\mu_2$ is the ratio of the friction torque to the starting moment $\zeta \cdot M$. Thus, the final drive 12 is subject to a rolling torque $TR = (1 - \mu_2 \cdot \zeta) \cdot M$, which is the sum of the cardan shaft moment M and the friction torque $\mu_2 \cdot \zeta \cdot M$, around an axis extending in a direction parallel with the drive shaft axis 20.

Similarly, when the final drive 12 is subject to a pitching moment under the influence of the starting moment $\zeta \cdot M$ around the output shaft axis 28, the universal joint 30 works at an angular deflection turning the drive shaft 18 out of alignment with the cardan shaft. The cardan shaft moment M is exerted on the universal joint 30 to produce a friction torque in the direction opposite to the direction of the starting moment $\zeta \cdot M$; that is, in the direction returning the drive shaft 18 into alignment with the cardan shaft. This friction torque is represented as $\mu_1 \cdot M$ where $\mu_1$ is the ratio of the friction torque to the cardan shaft moment M. Thus, the final drive 12 is subject to a pitching torque $TP = (\zeta - \mu_1) \cdot M$, which is the sum of the cardan shaft moment $\zeta \cdot M$ and the friction torque $\mu_1 \cdot M$, around an axis extending in a direction normal to the drive shaft axis 20.

The resultant reaction torque is represented by a resultant torque vector which has a magnitude T and is directed at an angle $\alpha$ with respect to an axis extending in the direction of the width of the vehicle. Thus, the resultant reaction torque is defined as:

$$T = M\{(1 - \mu_2\zeta)^2 + (\zeta - \mu_1)^2\}^{\frac{1}{2}}$$

$$\tan \alpha = TR/TP = (1 - \mu_2\zeta)/(\zeta - \mu_1)$$

The first, second and third suspension points S1, S2 and S3 are given points lying in a common horizontal plane. Planes normal to the resultant torque vector around which the final drive 12 turns will be referred to as resultant torque support planes. The resultant torque support planes may include first, second and third resultant torque support planes SF1, SF2 and SF3. The first resultant torque support plane SF1 includes the first suspension point S1. The second resultant torque support plane SF2 includes the second suspension point S2. The third resultant torque support plane SF2 includes the third suspension point S3.

First and second orthogonal coordinate systems are used to calculate the reaction forces produced at the respective suspension points S1, S2 and S3. The first coordinate system is a two-dimensional orthogonal coordinate system, O-xy, having its y coordinate axis aligned with a rolling axis around which the final drive 12 rolls and its x coordinate axis extending normal to the y coordinate axis and through the origin O at which the y coordinate axis intersects the first resultant torque support plane SF1 including the first suspension point S1. In FIG. 1, the distance to the downward of the origin O along the x coordinate axis is the abscissa and the distance to the right of the origin O along the y coordinate axis is the ordinate. In the first coordinate system, O-xy, the first, second and third suspension points S1, S2 and S3 have the coordinates (x1, y1), (x2, y2), and (x3, y3), respectively.

The second coordinate system is a two-dimensional orthogonal coordinate system, O-uv, having its v coordinate axis aligned with the line in which the first resultant torque support plane SF1 and the horizontal plane including the y coordinate axis intersect and its u coordinate axis extending normal to the v coordinate axis and through the origin O and included in the horizontal plane including the y coordinate axis. In FIG. 1, the distance to the downward of the origin O along the u coordinate axis is the abscissa and the distance to the right of the origin O along the v coordinate axis is the ordinate. In the second coordinate system, O-uv, the first, second and third suspension points S1, S2 and S3 have the coordinates (O, v1), (u2, v2) and (u3, v3), respectively.

The supporting reaction forces P1, P2 and P3, which are produced at the respective suspension points S1, S2 and S3 in the presence of the resultant reaction torque, are obtained as follows:

The sum of the supporting reaction forces P1, P2 and P3 acting at the respective suspension points S1, S2 and S3 is zero in the second coordinate system.

$$P1 + P2 + P3 = 0 \quad (1).$$

The moments around the u coordinate axis are balanced.

$$v1 \cdot P1 + v2 \cdot P2 + v3 \cdot P3 = T \quad (2).$$

The moments around the v coordinate axis are balanced.

$$u2 \cdot P2 + u3 \cdot P3 = 0 \quad (3).$$

Solving Equations (1), (2) and (3) for the supporting reaction forces P1, P2 and P3 yields $$P1 = \frac{u2 - u3}{u3 \cdot (v2 - v1) - u2 \cdot (v3 - v1)} T \quad (4)$$

$$P2 = \frac{u3}{u3 \cdot (v2 - v1) - u2 \cdot (v3 - v1)} T \quad (5)$$

$$P3 = \frac{-u2}{u3 \cdot (v2 - v1) - u2 \cdot (v3 - v1)} T \quad (6)$$

Figure 2:
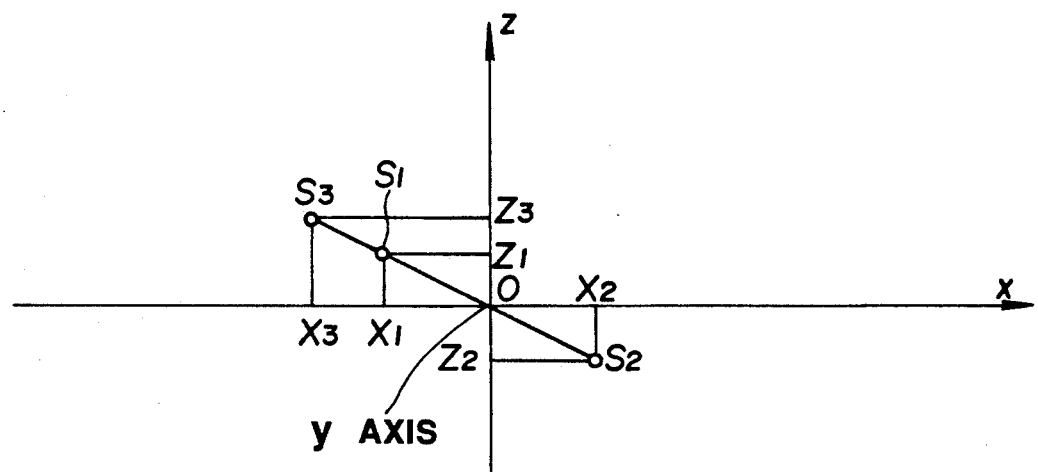

Considerations are made to optimum conditions under which the final drive 12 turns in the direction of the rolling moment but it does not turn in the direction of the pitching moment. FIG. 2 is a diagram showing the first, second and third suspension points S1, S2 and S3 as viewed from the front of the vehicle. It is now assumed that the suspension points S1, S2 and S3 are located to satisfy the optimum conditions where the final drive 12 rolls around the y coordinate axis (rolling axis) but it does not pitch when the supporting reaction forces P1, P2 and P3 are exerted at the respective suspension points S1, S2 and S3. In FIG. 2, the character z designates the z coordinate axis extending normal to the x and y coordinate axes and through the origin O, and the characters z1, z2 and z3 designate the vertical displacements of the respective suspension points S1, S2 and S3.

Under the optimum conditions, the first, second and third suspension points S1, S2 and S3 are located at the same angle with respect to the y coordinate axis. Thus, the following relation is obtained:

$$\frac{z1}{x1} = \frac{z2}{x2} = \frac{z3}{x3} \quad (7)$$

The horizontal displacements z1, z2 and z3 of the respective suspension points S1, S2 and S3 in the z- direction perpendicular to the x and y coordinate axes are given as $$z1 = \frac{P1}{k1} \tag{8}$$

$$= \frac{T}{u3 \cdot (v2 - v1) - u2 \cdot (v3 - v1)} \cdot \frac{(u2 - u3)}{k1}$$

$$z2 = \frac{P2}{k2} \tag{9}$$

$$= \frac{T}{u3 \cdot (v2 - v1) - u2 \cdot (v3 - v1)} \cdot \frac{u3}{k2}$$

$$z3 = \frac{P3}{k3} \tag{10}$$

$$= \frac{T}{u3 \cdot (v2 - v1) - u2 \cdot (v3 - v1)} \cdot \frac{-u2}{k3}$$

where k1, k2 and k3 are rigidities of the suspension elements located at the first, second and third suspension points S1, S2 and S3, respectively.

Substituting Equation (8), (9) and (19) into Equation (7) yields the following equation:

$$\frac{\frac{u2 - u3}{k1}}{x1} = \frac{\frac{u3}{k2}}{x2} = \frac{\frac{-u2}{k3}}{x3} \tag{11}$$

It is, therefore, possible to prevent the final drive 12 from pitching by selecting the positions (x1, x2, x3, u2 and u3) of the respective suspension points S1, S2 and S3 in such a manner that Equation (11) holds or by selecting the positions (x1, x2, x3, u2 and u3) of the respective suspension points S1, S2 and S3 and the rigidities (k1, k2 and k3) at the respective suspension points S1, S2 and S3 in such a manner that Equation (11) holds. If Equation (11) holds exactly or substantially, the resultant torque of the reaction torque TR (rolling torque) acting on the final drive 12 around the drive shaft axis 20 and the reaction torque TP (pitching torque) acting on the final drive 12 in around the output shaft axis 28 prevent the final drive 12 from pitching so that the drive shaft 18 works at substantially no angular deflection with respect to the cardan shaft. This is effective to minimize noises and vibrations at the joints provided at the outer ends of the cardan shaft.

Considerations are further made to the detailed conditions for which Equation (11) holds. There are four cases where the first, second and third suspension points S1, S2 and S3 are located with respect to the y coordinate axis (rolling axis).

(I) First Case

FIG. 3(a) shows a first case where all of the suspension points S1, S2 and S3 are located on the left side of the y coordinate axis. In this conditions, x1>0, x2>0 and x3>0. If all of the first, second and third terms of Equation (11) are positive, u2>u3, u3>0 and u2<0 since k1>0, k2>0 and k3>0. These conditions are contradictory to each other. If all of the first, second and third terms of Equation (11) are negative, u2<u3, u3<0 and u2>0. These conditions are contradictory to each other. Thus, Equation (11) cannot hold when all of the first, second and third suspension points S1, S2 and S3 are located on the left side of the y coordinate axis.

(II) Second Case

FIG. 3(b) shows one example of a second case where two of the suspension points S1, S2 and S3 are located on the left side of the y coordinate axis and the other suspension point is located on the right side of the y coordinate axis. It is to be noted that the positions of the first, second and third suspension points S1, S2 and S3 are exchangeable to each other.

Considerations are made for the case where the first suspension point S1 is located on the right side of the y coordinate axis and the second and third suspension points S2 and S3 are located on the left side of the y coordinate axis, as shown in FIG. 3(b). In this case, x1<0, x2>0 and x3>0. If all of the first, second and third terms of Equation (11) are positive, u2−u3<0, u3>0 and −u2>0 since k1>0, k2>0 and k3>0. These conditions are fulfilled when u2<0<u3. If all of the first, second and third terms of Equation (11) are negative, u2−u3>0, u3<0 and −u2<0. These conditions are fulfilled when u3<0<u2. It is, therefore, apparent that Equation (11) holds when the two suspension points located on the left side of the y coordinate axis are located on the opposite sides of the first resultant torque support plane SF1 including the first suspension point S1.

When the second suspension point S2 is located on the right side of the first resultant torque support plane SF1 and the third suspension point S3 is located on the left side of the first resultant torque support plane SF1, the conditions of x2>0 and u2<0 should be fulfilled for the second suspension point S2 and the conditions of x3>0 and u3>0 should be fulfilled for the third suspension point S3.

(III) Third Case

FIG. 3(c) shows one example of a third case where one of the suspension points S1, S2 and S3 is located on the left side of the y coordinate axis and the other suspension points are located on the right side of the y coordinate axis. It is to be noted that the positions of the first, second and third suspension points S2, S2 and S3 are exchangeable to each other.

Considerations are made for the case where the first and third suspension points S1 and S3 are located on the right side of the y coordinate axis and the second suspension point S2 are located on the left side of the y coordinate axis, as shown in FIG. 3(c). In this case, x1<0, x2>0 and x3<0. If all of the first, second and third terms of Equation (11) are positive, u2−u3<0, u3>0 and −u2<0 since k1>0, k2>0 and k3>0. These conditions are fulfilled when 0<u2<u3. If all of the first, second and third terms of Equation (11) are negative, u2−u3>0, u3<0 and −u2>0. These conditions are fulfilled when u3<u2<0. The positions of the first and third suspension points S1 and S3 are exchangeable to each other. When the first suspension point S1 is located on the left side of the first resultant torque support plane SF1 and the third suspension point S3 is located on the right side of the first resultant torque support plane SF1, the conditions of x2>0 and u2<0 should be fulfilled for the second suspension point S2 and the conditions of x3<0 and u3<0 should be fulfilled for the third suspension point S3.

(IV) Fourth Case

FIG. 3(d) shows a fourth case where all of the suspension points S1, S2 and S3 are located on the right side of the y coordinate axis. In this conditions, x1<0, x2<0 and x3<0. If all of the first, second and third terms of Equation (11) are positive, u2<u3, u3<0 and u2<0 since k1>0, k2>0 and k3>0. These conditions are contradictory to each other. If all of the first, second and third terms of Equation (11) are negative, u2>u3, u3>0 and u2<0. These conditions are contradictory to each other. Thus, Equation (11) cannot hold when all of the first, second and third suspension points S1, S2 and S3 are located on the right side of the y coordinate axis.

As can be seen from the foregoing that Equation (11) cannot hold except when the second suspension point S2 is located on the right side of the first resultant torque support plane SF1 if the first suspension point S1 is located on the right side of the y coordinate axis (rolling axis) and the second and third suspension points S2 and S3 are located on the left side of the y coordinate axis. In other words, the second suspension point S2 should be located in rear of the first suspension point S1 and in an acute-angled zone made between the first resultant torque support plane SF1 and the plane parallel to the drive shaft axis 20 and including the y coordinate axis, as shown in FIG. 4(a) where this zone is indicated by the hatched area.

If the third suspension point S3 is located on the left side of the y coordinate axis, the third suspension point S3 should be located on the left side of the first resultant torque support plane SF1. Alternatively, if the third suspension point S3 is located on the right side of the y coordinate axis, the third suspension point S3 should be located on the right side of the second resultant torque support plane SF2 including the second suspension point S2. In other words, the third suspension point S3 should be located out of a zone indicated by the hatched area of FIG. 4(b).

If Equation (11) holds, the resultant torque T will serve to prevent the pitching motion of the final drive 12 around an axis extending in the direction of the length of the vehicle.

Figure 5A:
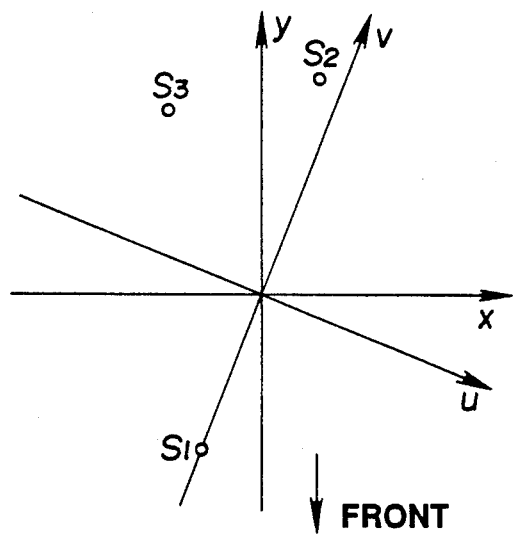

Referring to FIG. 5(a) there is illustrated one example of the locations of the first, second and third suspension points S1, S2 and S3 which fulfill the conditions under which Equation (11) holds. In the illustrated case, the all of the first, second and third terms of Equation (11) are negative since u2−u3>0 and x1<0, u3<0 and x2>0, and u2< and x3<0. FIG. 5(b) shows the first, second and third suspension points S1, S2 and S3, which are located as shown in FIG. 5(a), as viewed from the front of the vehicle. It can be seen from FIG. 5(b) that the first, second and third suspension points S1, S2 and S3 are inclined at the same angle in the same direction with respect to the y coordinate axis.

Figure 5C:
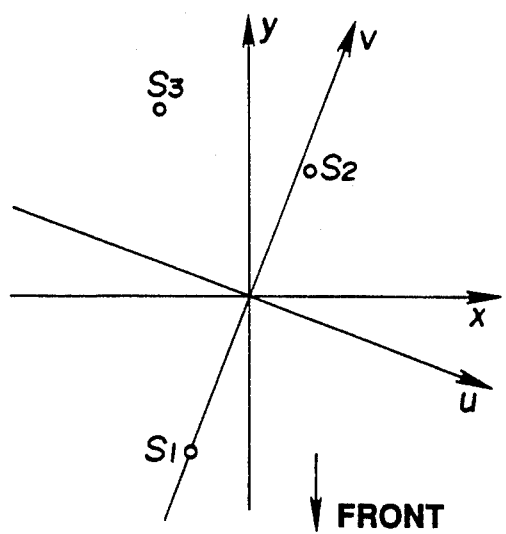
Figure 5B:
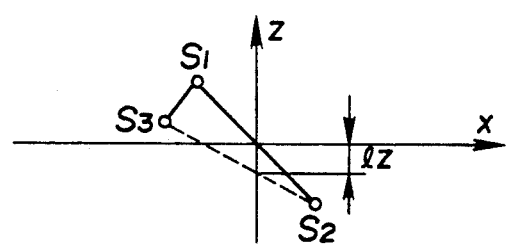
Figure 5D:
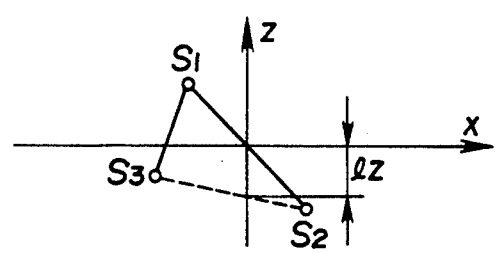

Referring to FIG. 5(c), there is illustrated one example of the locations of the first, second and third suspension points S1, S2 and S3 which do not to fulfill the conditions under which Equation (11) holds. In the illustrated case, the first term of Equation (11) is negative since u2−u3>0 and x1<0, the second term of Equation (11) is negative since u3<0 and x2>0, and the third term of Equation (11) is positive since u2< and x3<0. FIG. 5(d) shows the first, second and third suspension points S1, S2 and S3, which are located as shown in FIG. 5(c), as viewed from the front of the vehicle. It can be seen from FIG. 5(d) that the direction in which the third suspension point S3 is inclined with respect to the y coordinate axis is different from the direction in which the first and second suspension points S1 and S2 are inclined with respect to the y coordinate axis.

It is also apparent by a comparison of FIGS. 5(b) and 5(d) that the displacement lz (FIG. 5(b)) made in the z-direction under the conditions Equation (11) holds is less than the displacement lz (FIG. 5(d)) made in the z-direction under the conditions where Equation (11) does not hold.

The relationship among the rigidities k1, k2 and k3 at the respective suspension points S1, S2 and S3 located in such a manner as to prevent the pitching motion of the final drive 12.

Equation (11) can be modified to the following form:

$$\frac{\frac{u2-u3}{x1}}{k1} = \frac{\frac{u3}{x2}}{k2} = \frac{\frac{-u2}{x3}}{k3} \quad (12)$$

Equation (12) can be modified to a form representing the ratios of the rigidities k1, k2 and k3.

$$k1{:}k2{:}k3{:} = \frac{u2-u3}{x1} : \frac{u3}{x2} : \frac{-u2}{x3} \quad (13)$$

It is now assumed that the second suspension point S2 is spaced at a distance l12 away from the first suspension point S1 in a direction parallel to the u coordinate axis and the third suspension point S3 is spaced at a distance l23 away from the second suspension point S2 and at a distance l31 away from the first suspension point S1 in a direction parallel to the u coordinate axis, the first suspension point S1 is spaced at a distance X1 away from the y coordinate axis (rolling axis) in a direction parallel to the x coordinate axis, the second suspension point S2 is spaced at a distance X2 away from the y coordinate axis (rolling axis) in a direction parallel to the x coordinate axis, and the third suspension point S3 is spaced at a distance X3 away from the y coordinate axis (rolling axis) in a direction parallel to the x-coordinate axis. These distances are given as $l12 = |u2|$ $l23 = |u2-u3|$ $l31 = |u3|$ $X1 = |x1|$ $X2 = |x2|$ $X3 = |x3|$.

Equation (13) can be modified to the following form:

$k1{:}k2{:}k3$ $$= \frac{l23}{X1} : \frac{l31}{X2} : \frac{l12}{X3}$$

$$= \frac{1}{X1 \cdot l31 \cdot l12} : \frac{1}{X2 \cdot l12 \cdot l23} : \frac{1}{X3 \cdot l23 \cdot l31} \quad (14)$$

$$= \frac{X3 \cdot l23}{X1 \cdot l12} : \frac{X3 \cdot l31}{X2 \cdot l12} : 1 \quad (15)$$

It is, therefore, possible to prevent the final driver 12 from pitching by locating the first, second and third suspension points S1, S2 and S3 at positions described in connection with FIG. 4(b) and setting the rigidities at the respective suspension points S1, S2 and S3 in such a manner that Equation (14) or (15) holds.

Description will be made to a second approach made in the invention with reference to FIG. 6 which shows the same final drive unit as described in connection with FIGS. 1 to 5.

Figure 6:
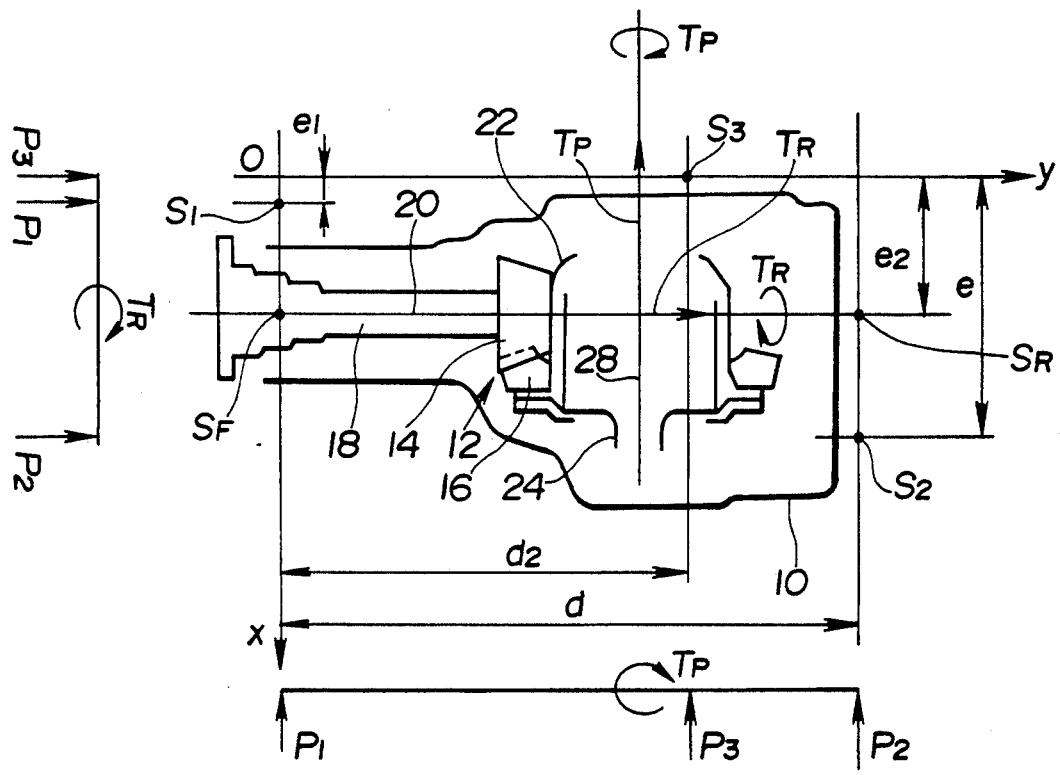
FIG. 6 is a diagram used in explaining a second approach made in the invention.

It is first assumed that the axle gear casing 10 is suspended elastically flexibly at the floor of the vehicle body through three elastic suspension elements located at suspension points S1, S2 and S3, as shown in FIG. 6. The first suspension point S1 is located in front of the axle shafts axis 28 and the second and third suspension points S2 and S3 are located behind the axle shaft axis 28. The second suspension point S2 is located on the same side as the bevel wheel 16 with respect to the drive shaft axis 20, whereas the first and third suspension points S1 and S3 are located on the side opposite from the bevel wheel 16 with respect to the drive shaft axis 20. In a two-dimensional orthogonal coordinate system, O-xy, with the x coordinate axis extending parallel to the axle shaft axis 28 (or to the lateral central axis of the axle gear casing 10) and through the first suspension point S1 and the y coordinate axis extending parallel to the drive shaft axis 20 (or to the longitudinal central axis of the axle gear casing 10) and through the third suspension point S3, the first suspension point S1 has the coordinates (e1, 0), the second suspension point S2 has the coordinates (e, d), and the third suspension point S3 has the coordinates (0, d2). In FIG. 6, the distance to the right of O along the x coordinate axis is the abscissa and the distance to the downward of O along the y coordinate axis is the ordinate. The drive shaft axis 20 is spaced at a transverse distance e2 away from the x coordinate axis.

Assuming now that TR is the reaction torque (rolling torque) acting around the drive shaft axis 20, TP is the reaction torque (pitching torque) acting around the output shaft axis 28, $\zeta 2$ is the ratio (TP/TR) of the pitching torque TP to the rolling torque TR, and P1, P2 and P3 are the supporting reaction forces exerted at the respective suspension points S1, S2 and S3.

It is to be noted that the ratio $\zeta 2$ is equal to the reduction ratio $\zeta$ of the final drive 12 in the absence of the friction torque $\mu 1 \cdot M$ produced in the universal joint 30 (FIG. 1) and the friction torque $\mu 2 \cdot \zeta \cdot M$ produced in the universal joint 32 (FIG. 1). In this case, TR=M and TP=$\zeta \cdot$M.

The supporting reaction forces P1, P2 and P3 produced at the respective suspension points S1, S2 and S3 are obtained as follows:

The sum of the moments around the y coordinate axis is zero.

$$TR - e1 \cdot P1 - e \cdot P2 = 0 \tag{16}$$

The sum of the moments around the axis extending parallel to the x coordinate axis and through the third suspension point S2 is zero.

$$d \cdot P1 + TP + (d - d2) \cdot P3 = 0 \tag{17}$$

It is to be noted that the mass of the final drive unit may be ignored since the rolling and pitching torques TR and TP are much greater than the torque produced in relation to the mass of the final drive. The sum of the supporting reaction forces P1, P2 and P3 acting at the first second and third suspension points S1, S2 and S3, respectively, is zero.

$$P1 + P2 + P3 = 0 \tag{18}$$

Solving Equations (16), (17) and (18) for the supporting reaction forces P1, P2 and P3 yields $$P1 = -\frac{\zeta 2 \cdot e - (d - d2)}{e1 \cdot d + (e - e1) \cdot d2} TM \tag{19}$$

$$P2 = \frac{\zeta 2 \cdot e1 + d2}{e1 \cdot d + (e - e1) \cdot d2} TM \tag{20}$$

$$P3 = \frac{\zeta 2 \cdot (e - e1) - d}{e1 \cdot d + (e - e1) \cdot d2} TM \tag{21}$$

The displacement z1, z2 and z3 of the respective suspension points S1, S2 and S3 in the z-direction perpendicular to the x and y coordinate axes are given as $$z1 = \frac{P1}{k1} \tag{22}$$

$$z2 = \frac{P2}{k2} \tag{23}$$

$$z3 = \frac{P3}{k3} \tag{24}$$

where k1, k2 and k3 are the rigidities of the suspension elements located at the first, second and third suspension points S1, S2 and S3, respectively.

In the three-dimensional orthogonal coordinate system, O-xyz, with the z coordinate axis extending normal to the x and y coordinate axes and through the origin 0, the first, second and third suspension points S1, S2 and S3 are expressed as S1(e1, 0, z1), S2(e, d, z2) and S3(0, d2, z3). Therefore, the plane in which the suspension points S1, S2 and S2 lie is given by $$\begin{aligned} z &= [1/\{e \cdot d2 + e1 \cdot (d - d2)\}] \times [\{d \cdot (z1 - z3) + \\ &\quad d2 \cdot (z2 - z1)\} \cdot x + \{e1 \cdot (z2 - z3) - e \cdot \\ &\quad (z1 - z3)\} \cdot y + e \cdot d2 \cdot z1 - e1 \cdot d2 \cdot z2 + e1 \cdot d \cdot z3] \\ &= [1/\{e \cdot d2 + e1 \cdot (d - d2)\}] \times [\{(d - d2) \cdot z1 + \\ &\quad d2 \cdot z2 - d \cdot z3\} \cdot x + \{-e \cdot z1 + e1 \cdot z2 + (e - e1) \cdot \\ &\quad z3\} \cdot y + e \cdot d2 \cdot z1 - e1 \cdot d2 \cdot z2 + e1 \cdot d \cdot z3] \end{aligned} \tag{25}$$

If no displacement occurs in the z-direction at two given points lying in the axis 20 of the drive shaft 18, it means that the drive shaft 18 is held in its original position. In other words, if two given points SF (e2, 0, 0) and SR (e2, d, 0) satisfy Equation (10) regardless of the z-direction displacements z1, z2 and z3, it means that no change occurs in the angle between the drive shaft 18 and the cardan shaft 32. Substituting the points SF and SR and Equations (22), (23) and (24) into Equation (25) yields the following equations:

$$\left\{ (d - d2) \cdot \frac{P1}{k1} + d2 \cdot \frac{P2}{k2} - d \cdot \frac{P3}{k3} \right\} e2 + \\ e \cdot d2 \cdot \frac{P1}{k1} - e1 \cdot d2 \cdot \frac{P2}{k2} + e1 \cdot d \cdot \frac{P3}{k3} = 0 \tag{26}$$

$$\left\{ (d - d2) \cdot \frac{P1}{k1} + d2 \cdot \frac{P2}{k2} - d \cdot \frac{P3}{k3} \right\} e2 + \\ \left\{ -e \cdot \frac{P1}{k1} + e1 \cdot \frac{P2}{k2} + (e - e1) \cdot \frac{P3}{k3} \right\} d + \\ e \cdot d2 \cdot \frac{P1}{k1} - e1 \cdot d2 \cdot \frac{P2}{k2} + e1 \cdot d \cdot \frac{P3}{k3} = 0 \tag{27}$$

Equations (26) and (27) can be modified as $$\{e2 \cdot d + (e - e2) \cdot d2\} \cdot \frac{P1}{k1} + (e2 - e1) \cdot d2 \cdot \qquad (28)$$

$$\frac{P2}{k2} - (e2 - e1) \cdot d \frac{P2}{k3} = 0$$

$$-(e - e2)(d - d2) \cdot \frac{P1}{k1} + \{e1 \cdot d + (e2 - e1) \cdot d2\} \cdot \qquad (29)$$

$$\frac{P2}{k2} + (e - e2) \cdot d \cdot \frac{P3}{k3} = 0$$

Equations (28) and (29) can be modified to forms including ratios of k1, k2 and k3.

$$\{e2 \cdot d + (e - e2) \cdot d2\} \cdot P1 \cdot \frac{k3}{k1} + \qquad (30)$$

$$(e2 - e1) \cdot d2 \cdot P2 \cdot \frac{k3}{k2} - (e2 - e1) \cdot d \cdot P3 = 0$$

$$-(e - e2)(d - d2) \cdot P1 \cdot \frac{k3}{k1} + \qquad (31)$$

$$\{e1 \cdot d + (e2 - e1) \cdot d2\} \cdot P2 \cdot \frac{k3}{k2} + (e - e2) \cdot d \cdot P3 = 0$$

Solving Equations (30) and (31) for k3/k1 and k3/k2 respectively, yields $$\frac{k3}{k1} = \frac{BF - CE}{AE - BD} \qquad (32)$$

$$\frac{k3}{k2} = \frac{CD - AF}{AE - BD} \qquad (33)$$

where $A = \{e2 \cdot d + (e - e2) \cdot d2\} \cdot P1$
$B = (e2 - e1) \cdot d2 \cdot P2$
$C = -(e2 - e1) \cdot d \cdot P3$
$D = -(e - e2)(d - d2) \cdot P1$
$E = \{e1 \cdot d + (e2 - e1) \cdot d2\} \cdot P2$
$F = (e - e2) \cdot d \cdot P3$ Rearrangement gives the following equations $$\frac{k3}{k1} = \frac{e2 - e1}{e2} \cdot \frac{P3}{P1} \qquad (34)$$

$$= \left(1 - \frac{e1}{e2}\right) \cdot \frac{-\zeta2 + \zeta2 \cdot e1/e + d/e}{\zeta2 + d2/e - d/e}$$

$$\frac{k3}{k2} = \frac{e2 - e}{e2} \cdot \frac{P3}{P2} \qquad (35)$$

$$= \left(1 - \frac{e}{e2}\right) \cdot \frac{\zeta2 - \zeta2 \cdot e1/e - d/e}{\zeta2 \cdot e1/e + d2/e}$$

It is, therefore, possible to hold the drive shaft 18 in its original position regardless of changes of the position of the final drive unit by selecting the positions (determined by e, e1, e2, d, d2) and the rigidities k1, k2 and k3 of the respective suspension points S1, S2 and S3 in a manner to satisfy Equations (34) and (35).

Considerations are made to the conditions for which Equation (34) holds. Since the left side (k3/k1) of Equation (34) is positive, the right side of Equation (34) should be positive. Thus, Equation (34) may be considered to hold for the following four cases of conditions:

Case (I)   $1 - e1/e2 > 0$,
         $-\zeta2 + \zeta2 \cdot e1/e + d/e > 0$, and
         $\zeta2 + d2/e - d/e > 0$ or $$\frac{e1}{e2} < 1 \text{ and } \zeta2 \cdot \left(1 - \frac{e1}{e}\right) < \frac{d}{e} < \zeta2 + \frac{d2}{e}$$

These conditions can be fulfilled.

Case (II)   $1 - e1/e2 > 0$,
          $-\zeta2 + \zeta2 \cdot e1/e + d/e < 0$, and
          $\zeta2 + d2/e - d/e < 0$ or $$\frac{e1}{e2} < 1 \text{ and } \left(\zeta2 + \frac{d2}{e}\right) < \frac{d}{e} < \zeta2 \cdot \left(1 - \frac{e1}{e}\right)$$

These conditions cannot be fulfilled.

Case (III)   $1 - e1/e2 < 0$
           $-\zeta2 + \zeta2 \cdot e1/e + d/e < 0$
           $\zeta2 + d2/e - d/e > 0$ or $$1 < \frac{e1}{e2} \text{ and } \frac{d}{e} < \zeta2 \cdot \left(1 - \frac{e1}{e}\right)$$

These conditions can be fulfilled.

Case (IV)   $1 - e1/e2 < 0$
           $-\zeta2 + \zeta2 \cdot e1/e + d/e > 0$
           $\zeta2 + d2/e - d/e < 0$ or $$1 < \frac{e1}{e2} \text{ and } \zeta2 + \frac{d2}{e} < \frac{d}{e}$$

These conditions can be fulfilled.

Considerations are made to the conditions for which Equation (35) holds. Since the left side (k3/k2) of Equation (35) is positive, the right side of Equation (35) should be positive. Thus, Equation (35) may be considered to hold for the following two cases of conditions since $\zeta2 \cdot e1/e + d2/e$ are always positive except when the first and third suspension points S1 and S3 are located at the origin O (when e1=0 and d2=0).

Case (V)   $1 - e/e2 > 0$, and
         $\zeta2 - \zeta2 \cdot e1/e + d/e > 0$ or $$\frac{e}{e2} < 1 \text{ and } \frac{d}{e} < \zeta2 \cdot \left(1 - \frac{e1}{e}\right)$$

Case (VI)   $1 - e/e2 < 0$
           $\zeta2 - \zeta2 \cdot e1/e - d/e < 0$ or $$1 < \frac{e}{e2} \text{ and } \zeta 2 \cdot \left(1 - \frac{e1}{e}\right) < \frac{d}{e}$$

If the conditions of selected one of the first, third and fourth cases (I), (III) and (IV) are not contradictory to the conditions of selected one of the fifth and sixth cases (V) and (VI), both of Equations (34) and (35) will hold for the combination of the conditions of the selected cases. We can found two combinations, the first combination being the combination of the conditions of the first case (I) and the conditions of the sixth case (VI). The second combination is the combination of the conditions of the fourth case (IV) and the conditions of the sixth case (VI). The conditions of the first combination are given as $$e1 < e2 < e \text{ and } \zeta 2 \cdot \left(1 - \frac{e1}{e}\right) < \frac{d}{e} < \zeta 2 + \frac{d2}{e}$$

If these conditions for which both of Equations (34) and (35) hold are fulfilled, the rolling motion which would be produced on the final drive unit due to the cardan shaft moment around the drive shaft axis 20 and the pitching motion which would be produced on the final drive unit due to the starting moment around the axle shaft axis 28 will be canceled with each other on the the drive shaft axis 20 so that the drive shaft 18 can be held in its original position. Because of this, no bending force acts on the joint between the drive shaft 18 and the cardan shaft 32 and thus no vibrations and noises occur at the joint between the drive shaft 18 and the cardan shaft 32.

These conditions of the first combination can be fulfilled, for example, when $\zeta 2 = 4$, $e1/e = \frac{1}{4}$, $e2/e = \frac{1}{2}$, $e1/e2 = \frac{1}{2}$, $d/e = 5$ and $d2 = d$. In this case, k1:k2:k3 = 4:3:1, as can be derived from Equations (34) and (35). It is to be noted that the torque ratio 2 is equal to $(\zeta - \mu 1)/(1 - \mu 2 \cdot \zeta)$.

The conditions of the first combination can also be fulfilled when $\zeta 2 = 4$, $e1 = o$, $e2/e = \frac{1}{2}$, $d/e = 5$, and $d2 = d$. In this case, k1:k2:k3 = 4:5:1, as can be derived from Equations (34) and (35).

From the above two examples, the following set of conditions can be derived:

$$e1 << e(\text{or } e1 = 0), \text{ and } d2 = d.$$

These conditions are fulfilled when the first suspension point S1 is located in front of the axle shaft axis 28, whereas the second and third suspension points S2 and S3 are located behind the axle shaft axis 28, and when the first and third suspension points S1 and S3 are located on one side of the drive shaft axis 20, whereas the second suspension point S2 and the bevel wheel 16 are located on the other side of drive shaft axis 20. In this case, the rigidity k3 at the third suspension point S3 should be smaller than the rigidities k1 and k2 at the first and second suspension points S1 and S2 to hold the drive shaft 18 substantially in its original position regardless of changes in the position of the final drive unit or the axle gear casing 10. It is to be understood that such a desirable effect can be achieved as long as the conditions to be set for the positions of the first, second and third suspension points S1, S2 and S3 and the rigidities at the first, second and third suspension points S1, S2 and S3 are close to the conditions for which Equations (34) and (35) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (34) and (35) hold so that the angular deflection of the drive shaft 18 with respect to the cardan shaft 32 can be reduced further.

An additional suspension point may be provided along with the first, second and third suspension points S1, S2 and S3 to suspend the final drive unit. In this case, the rigidity at the additional suspension point should be smaller than the rigidities at the first, second and third suspension points S1, S2 and S3 to bring the set conditions closer to the conditions for which Equations (34) and (35) hold and thus to further reduce the angular deflection of the the drive shaft 18 with respect to the cardan shaft 32.

The conditions of the first combination can also be fulfilled when $\zeta 2 = 4$, $e1 = 0$, $e2/e = \frac{1}{2}$, $d2/e = \frac{2}{3}$, and $d/e = 13/3$. In this case, k1:k2:k3 = 1:2:1, as can be derived from Equation (34) and (35).

From this example, the following set of conditions can be derived:

$$e1 = 0, \text{ and } d2 << d.$$

These conditions are fulfilled when the first and third suspension points S1 and S3 are located in front of the axle shaft axis 28, whereas the second suspension point S2 is located behind the axle shaft axis 28, and when the first and third suspension points S1 and S3 are located on one side of the drive shaft axis 20, whereas the second suspension point S2 and the bevel wheel 16 are located on the other side of the drive shaft axis 20, and when the transverse distance between the first and third suspension points S1 and S3 is zero. In this case, the rigidities at the first and third suspension points S1 and S3 should be smaller than the rigidity at the second suspension point S2 to hold the drive shaft 18 substantially in its original position regardless of changes in the position of the final drive unit. It is to be understood that such a desirable effect can be achieved as long as the conditions to be set for the positions of the first second and third suspension points S1, S2 and S3 and the rigidities at the first, second and third suspension points S1, S2 and S3 are close to the conditions for which Equations (34) and (35) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (34) and (35) hold so that the angular deflection of the drive shaft 18 with respect to the cardan shaft 32 can be reduced further.

An additional suspension point may be provided along with the first, second and third suspension points S1, S2 and S3 to suspend the final drive unit. In this case, the rigidity at the additional suspension point should be smaller than the rigidities at the first, second and third suspension points S1, S2 and S3 to bring the set conditions closer to the conditions for which Equations (34) and (35) hold and thus to further reduce the angular deflection of the drive shaft 18 with respect to the cardan shaft 32.

The conditions of the second combination are given as $$e2 < e1, e \text{ and } \zeta 2 + \frac{d2}{e} < \frac{d}{e}$$

If these conditions for which both of Equations (34) and (35) hold are fulfilled, the rolling motion which would be produced on the final drive unit due to the cardan shaft torque around the drive shaft axis 20 and the pitching motion which would be produced on the final drive unit due to the starting torque around the axle shaft axis 28 will be canceled with each other on the axis 20 of the drive shaft 18 so that the drive shaft 18 can be held in alignment with the cardan shaft 32. Because of this, no bending force acts on the joint between the drive shaft 18 and the cardan shaft 32 and thus no vibrations and noises occur at the joint between the drive shaft 18 and the cardan shaft 32.

These conditions of the second combination can be fulfilled, for example, when $\zeta 2=4$, $e1/e=1$, $e2/e=\frac{1}{2}$, $e1/e2=2$, $d2/e=\frac{1}{3}$ and $d/e=5$. In this case, $k1:k2:k3=2:13:15$, as can be derived from Equations (34) and (35).

The conditions of the second combination can also be fulfilled when $\zeta 2=4$, $d2=0$, $e1/e=1$, $e2/e=\frac{1}{2}$, $e1/e2=2$ and $d/e=5$. In this case, $k1:k2:k3=1:4:5$, as can be derived from Equations (34) and (35).

From the above two examples, the following set of conditions can be derived:

$$e1=e \text{ and } d2 << d (\text{or } d2=0).$$

These conditions are fulfilled when the first and third suspension points S1 and S3 are located in front of the axle shaft axis 28, whereas the second suspension point S2 is located behind the axle shaft axis 28, and when the first and second suspension points S1 and S2 are located on one side of the drive shaft axis 20, whereas the third suspension point S3 and the bevel wheel 16 are located on the other side of the drive shaft axis 20. In this case, the rigidity at the first suspension point S1 should be smaller than the rigidities at the second and third suspension points S2 and S3 to hold the drive shaft 18 substantially in its original position regardless of changes in the position of the final drive. It is to be understood that such a desirable effect can be achieved as long as the conditions to be set for the positions of the first, second and third suspension points S1, S2 and S3 and the rigidities at the first, second and third suspension points S1, S2 and S3 are close to the conditions for which Equations (34) and (35) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (34) and (35) hold so that the angular deflection of the drive shaft 18 with respect to the cardan shaft 32 can be reduced further.

An additional suspension point may be provided along with the first, second and third suspension points S1, S2 and S3 to suspend the final gear unit. In this case, the rigidity at the additional suspension point should be smaller than the rigidities at the first, second and third suspension points S1, S2 and S3 to bring the set conditions closer to the conditions for which Equations (34) and (35) hold and thus to further reduce the angular deflection of the drive shaft 18 with respect to the cardan shaft 32.

Figure 7:
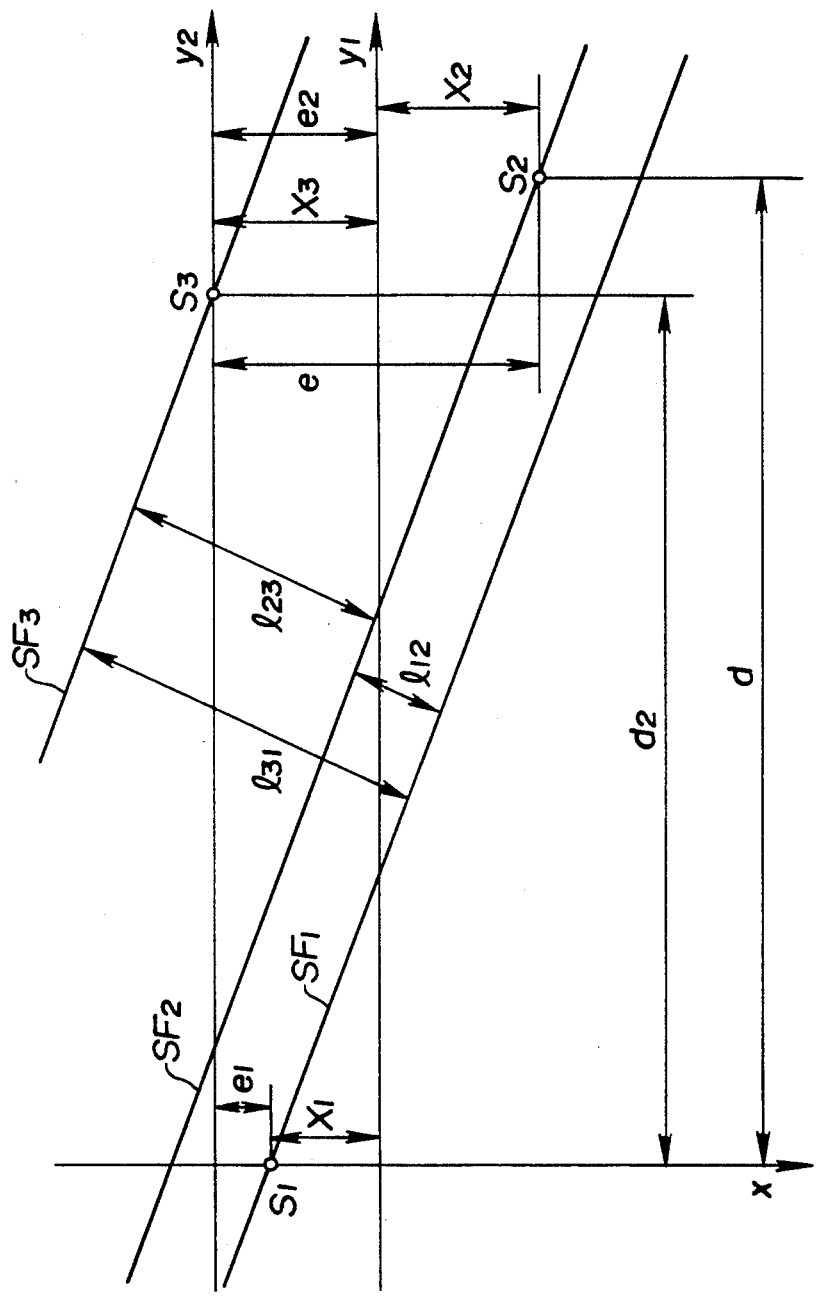
FIG. 7 is a diagram used in explaining that the results obtained in the first and second approaches are equivalent.

Referring to FIG. 7, it will be explained that Equations (34) and (35) are equivalent to Equation (14). In FIG. 7, the first, second and third resultant torque supporting planes SF1, SF2 and SF3 (FIG. 1) are drawn in a two-dimensional orthogonal coordinate system, O-xy2, which is the same as the coordinate system, O-xy, used in FIG. 6, and in a two-dimensional orthogonal coordinate system, O-xy1 with the y1 coordinate axis aligned with the drive shaft axis 20.

Equation (14) can be modified to the following forms:

$$\frac{k3}{K1} = \frac{X1 \cdot l31 \cdot l12}{X3 \cdot l23 \cdot l21} \tag{36}$$

$$= \frac{X1 \cdot l12}{X3 \cdot l31}$$

$$\frac{k3}{K2} = \frac{X2 \cdot l12 \cdot l23}{X3 \cdot l23 \cdot l21} \tag{37}$$

$$= \frac{X2 \cdot l12}{X3 \cdot l21}$$

Since $k1>0$, $k2>0$ and $k3>0$, the left and right terms of each of Equations (34) and (35) are positive. Thus, Equations (34) and (35) can be modified to the following forms:

$$\frac{k3}{k1} = \left|1 - \frac{e1}{e2}\right| \cdot \frac{|-\zeta 2 + \zeta 2 \cdot e1/e + d/e|}{|\zeta 2 + d2/e - d/e|} \tag{38}$$

$$\frac{k3}{k2} = \left|1 - \frac{e}{e2}\right| \cdot \frac{|\zeta 2 - \zeta 2 \cdot e1/e - d/e|}{|\zeta 2 \cdot e1/e + d2/e|} \tag{39}$$

If Equation (36) is equivalent to Equation (38) and Equation (37) is equivalent to Equation (39), Equation (14) will be equivalent to Equations (34) and (35).

An equation for a line extending normal to the resultant torque vector T (FIG. 1) and through a given point (x1, y1) is given as $$\zeta 2 \cdot (x-x1) - (y-y1) = 0.$$

This equation can be modified as $$\zeta 2 \cdot x - y - \zeta 2 \cdot x1 + y1 = 0 \tag{40}$$

The length l0 of the perpendicular from a given point (x2, y2) to the line $ax+by+c=0$ is given as $$l0 = \frac{|a \cdot x2 + b \cdot y2 + c|}{(a^2 + b^2)^{\frac{1}{2}}} \tag{41}$$

Since $a=\zeta 2$, $b=-1$, and $c=-\zeta 2 \cdot x1 + y1$ (see Equation (40)), the distances 112, 123 and 131 are given using Equation (41).

$$l12 = \frac{|\zeta 2 \cdot (x1 - x2) - (y1 - y2)|}{(1 + \zeta 2^2)^{\frac{1}{2}}} \tag{42}$$

$$l23 = \frac{|\zeta 2 \cdot (x2 - x3) - (y2 - y3)|}{(1 + \zeta 2^2)^{\frac{1}{2}}} \tag{43}$$

-continued $$l31 = \frac{|\zeta 2 \cdot (x3 - x1) - (y3 - y1)|}{(1 + \zeta 2^2)^{\frac{1}{2}}} \quad (44)$$

Equations (42), (43) and (44) are converted into the coordinate system, O-xy2. Since $x1-x2=e1-e$ and $y1-y2=0-d=-d$ as shown in FIG. 7, Equation (42) can be simplified as $$l12 = \frac{|\zeta 2 \cdot (e1 - e) + d|}{(1 + \zeta 2^2)^{\frac{1}{2}}} \quad (45)$$

Since $x2-x3=e$ and $y2-y3=d-d2$, Equation (43) can be simplified as $$l23 = \frac{|\zeta 2 \cdot e - d + d2|}{(1 + \zeta 2^2)^{\frac{1}{2}}} \quad (46)$$

Since $x3-x1=0-e1=-e1$ and $y3-y1=d2$, Equation (44) can be simplified as $$l31 = \frac{|\zeta 2 \cdot (-e1) - d2|}{(1 + \zeta 2^2)^{\frac{1}{2}}} \quad (47)$$

Thus, $$\frac{l12}{l31} = \frac{|\zeta 2 \cdot (e1 - e) + d|}{|-\zeta 2 \cdot e1 - d2|} \quad (48)$$

$$= \frac{|\zeta 2 \cdot e1/e - \zeta 2 + d/e|}{|-\zeta 2 \cdot e1/e - d2/e|}$$

$$= \frac{|-\zeta 2 + \zeta 2 \cdot e1/e + d/e|}{|\zeta 2 \cdot e1/e + d2/e|}$$

$$\frac{l12}{l23} = \frac{|\zeta 2 \cdot (e1 - e) + d|}{|\zeta 2 \cdot e - d + d2|} \quad (49)$$

$$= \frac{|\zeta 2 \cdot e1/e - \zeta 2 + d/e|}{|\zeta 2 - d/e + d2/e|}$$

$$= \frac{|\zeta 2 - \zeta 2 \cdot e1/e - d/e|}{|\zeta 2 + d2/e - d/e|}$$

Substitution of Equation (48) into Equation (36) gives the following equation:

$$\frac{k3}{k1} = \frac{X1 \cdot l12}{X3 \cdot l31}$$

$$= \frac{|e2 - e1|}{|e2|} \cdot \frac{|-\zeta 2 + \zeta 2 \cdot e1/e + d/e|}{|\zeta 2 + d2/e - d/e|}$$

$$= \left|1 - \frac{e1}{e2}\right| \cdot \frac{|-\zeta 2 + \zeta 2 \cdot e1/e + d/e|}{|\zeta 2 + d2/e - d/e|}$$

Thus, Equation (36) is in coincidence with Equation (38). Substitution of Equation (49) into Equation (37) gives the following equation:

$$\frac{k3}{k2} = \frac{X2 \cdot l12}{X3 \cdot l21}$$

$$= \frac{|e2 - e|}{|e2|} \cdot \frac{|\zeta 2 - \zeta 2 \cdot e1/e - d/e|}{|\zeta 2 \cdot e1/e + d2/e|}$$

$$= \left|1 - \frac{e}{e2}\right| \cdot \frac{|\zeta 2 - \zeta 2 \cdot e1/e - d/e|}{|\zeta 2 \cdot e1/e + d2/e|}$$

Thus, Equation (37) is in coincidence with Equation (39).

Figure 8:
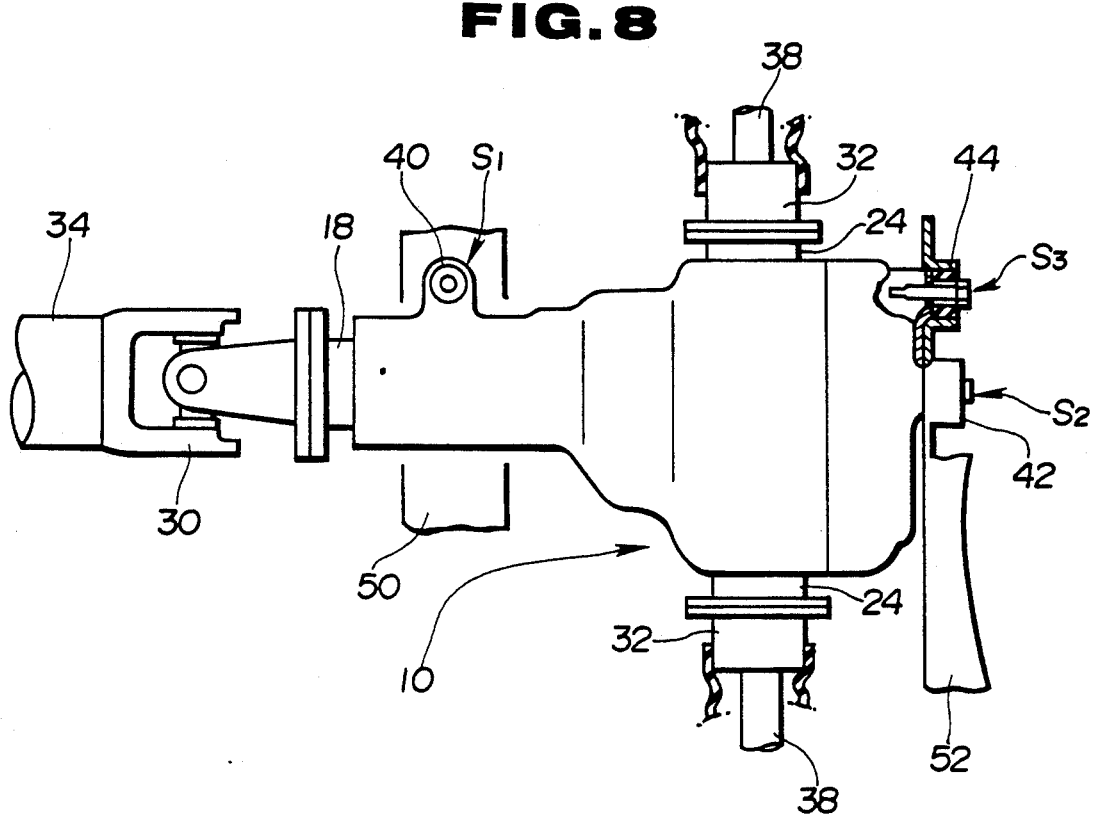
FIG. 8 is a plan view in section showing one embodiment of a suspension system made in accordance with the principles of the invention.
Figure 9:
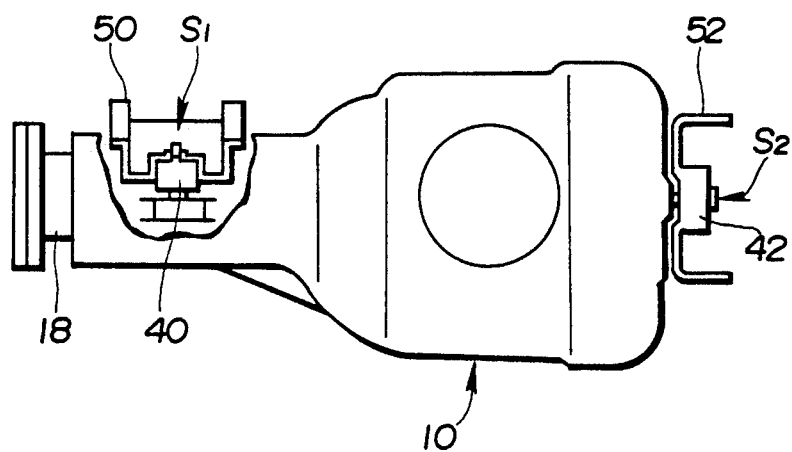
FIG. 9 is a side view in section of the suspension system of FIG. 8.

Referring to FIGS. 8 and 9, there is shown one embodiment of a final drive suspension system made in accordance with the principles of the invention. Like reference numerals have been applied to FIGS. 8 and 9 with respect to the like parts shown in FIGS. 1 and 6.

The axle gear casing 10 contains the same parts as described in connection with FIGS. 1 and 6. The drive shaft 18 is coupled through a cardan joint 30 to the cardan shaft 34. Two output shafts 24 extend in the direction of the width of the vehicle through the axle gear casing 10. Each of the output shafts 24 is connected through a universal joint 32 to the road wheel axle 38. From the engine the drive is transmitted through a clutch (not shown) and a gear box (not shown) to the cardan shaft 34 and hence through the drive shaft 18 to the final drive. The final drive 12, which has a bevel pinion 14 meshed with a bevel wheel 16 having a diameter greater than the diameter of the bevel pinion 14, as shown in FIGS. 1 and 6, turns the drive round through 90 degrees and reduces the speed in a selected ratio. The differential 22 (FIGS. 1 and 6) divides it equally between the two output shafts 24. From the output shafts 24, the drive is transmitted through the universal joints 32 to the road wheel axles 38, respectively.

The axle gear casing 10 is elastically flexibly suspended at the floor of the vehicle by means of first, second and third elastic suspension elements 40, 42 and 44 located at the respective suspension points S1, S2 and S3. The first, second and third elastic suspension element 40, 42 and 44 may be of the type having an elastic bush made of an elastic material, such as rubber. The first elastic suspension element 40 is secured on a carrier member 50 mounted at the floor of the vehicle to elastically flexibly suspend the axle gear casing 10 at the first suspension point S1. The second and third elastic suspension elements 42 and 44 are secured on another carrier member 50 mounted at the floor of the vehicle to elastically flexibly suspend the axle gear casing 10 at the second and third suspension points S2 and S3. The rigidity at each of the first, second and third suspension points S1, S2 and S3 may be adjusted by adjusting the shape and/or size of the elastic bush, by varying the carbon content of the elastic bush to adjust its hardness, or by adjusting the conditions under which the elastic bush is vulcanized.

The final drive 12 is subject to a reaction torque M exerted on the drive shaft 18, a reaction torque $\zeta \cdot M$ exerted on the output shafts 24, a friction torque $\mu 1 \cdot M$ produced at the universal joint 30 through which a rotational force is transmitted from the cardan shaft 32 to the drive shaft 18 and a friction torque $\mu 2 \cdot \zeta \cdot M$ produced at the universal joint 32 through which a rotational force is transmitted from the output shaft 24 to the road wheel axle 38. An angular deflection occurs in the universal joint 30 around an axis parallel to the x coordinate axis since the final drive 12 tends to turn in a plane normal to the x coordinate axis in the presence of the reaction torque around the output shafts 24. Similarly, an angular deflection occurs in the universal joint 32 around an axis parallel to the y coordinate axis since the final drive 12 tends to turn in a plane normal to the y coordinate axis in the presence of the reaction torque around the drive shaft 18. Therefore, the reaction torque exerted on the final drive 12 around the y coordinate axis is equal to a difference of the friction torque produced at the universal joint 31 from the reaction torque M resulting from the rotational force inputted to the drive shaft 18, whereas the reaction torque exerted on the final drive 12 around the x coordinate axis is equal to a difference of the friction torque produced at the universal joint 30 from the reaction torque resulting from the rotational force inputted to the road wheel axle 38. Consequently, the rolling torque TR, which is the total reaction torque around the drive shaft 18, is given as TR=$(1-\mu2\cdot\zeta)\cdot$M and the pitching torque TP, which is the total reaction torque around the output shafts 24, is given as TP=$(\zeta-\mu1)\cdot$M.

In this embodiment, the locations of the first, second and third suspension points S1, S2 and S3 are selected to fulfill the conditions described in connection with FIGS. 4(a) and 4(b). That is, the rolling axis around which the final drive 12 rolls exists between the first and second suspension points S1 and S2. The resultant torque supporting plane including the first suspension point S1 is on the left side with respect to the second suspension point S2. The resultant torque supporting plane including the second suspension point S2 is on the left side with respect to the third suspension point S3.

Figure 10:
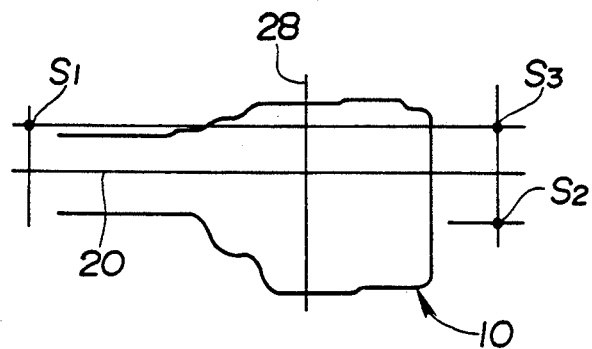
FIG. 10 is a schematic diagram used in explaining the positions of the first, second and third suspension points of the suspension system of FIG. 8.

Referring to FIG. 10, there is illustrated a second embodiment of the final drive suspension system of the invention. In this embodiment, the locations of the first, second and third suspension points S1, S2 and S3 are selected to fulfill the conditions of e1=0 and d2=0 which satisfy both of the first case (I) of conditions and the sixth case (VI) of conditions. That is, the first suspension point S1 is located in front of the output shaft axis 28. The second suspension point S2 is located behind the output shaft axis 28. The third suspension point S3 is located behind the output shaft axis 28. The first and third suspension points S1 and S3 are located on the side opposite from the bevel wheel 16 with respect to the drive shaft axis 20, whereas the second suspension point S2 is located on the same side as the bevel wheel 16 with respect to the drive shaft axis 20.

Substitution of e1=0 and d2=0 into Equations (34) and (35) gives the following equations for the ratios of the rigidities k1, k2 and k3 at the respective suspension points S1, S2 and S3.

$$\frac{k3}{k1} = \frac{1}{\zeta2} \cdot \frac{1}{e/d} - 1 \tag{50}$$

$$\frac{k3}{k2} = \frac{1}{e2/e} \cdot \left(1 - \frac{e}{d} \cdot \zeta2\right)\left(1 - \frac{e2}{e}\right) \tag{51}$$

If the transverse distance e of the third suspension point S3 from the y coordinate axis, the transverse distance e2 of the drive shaft axis 20 from the y coordinate axis, the longitudinal distance d of the second and third suspension points S2 and S3 from the x coordinate axis, and the rigidities k1, k2 and k3 of the respective suspension points S1, S2 and S3 are selected to satisfy Equations (50) and (51), the rolling motion of the final drive unit caused by the cardan shaft moment (rolling torque TR) around the drive shaft axis 20 and the pitching motion of the final drive unit caused by the starting moment (pitching torque TP) around the output shaft axis 28 will be canceled on the drive shaft axis 20. Because of this, the drive shaft 18 is held in its horizontal position and no change occurs in the angle between the drive shaft 18 and the cardan shaft 32. This minimizes the vibrations and noises which may occur at the cardan joint 30. In this case, Equations (50) and (51) hold, for example, when e2/e=$\frac{1}{2}$ and d/e=5 and k1:k2:k3=4:5:1.

When e1$\geq$0, the distances e, e1, e2, d and d2 and the rigidities k1, k2 and k3 may be selected to fulfill the conditions of e1/e=$\frac{1}{4}$, e2/e=$\frac{1}{2}$, e1/e2=$\frac{1}{2}$, d/e=5, d2=d, and k1:k2:k3=4:3:1. It is to be noted that Equations (50) and (51) hold also when e1<0.

Equations (50) and (51) hold approximately and substantially no change occurs in the angle of the drive shaft 18 with respect to the cardan shaft 32 as long as the rigidity k3 at the third suspension point S3 is smaller than the rigidities k1 and k2 at the first and second suspension points S1 and S2 when the first suspension point S1 is located in front of the output shaft axis 28, when the second suspension point S2 is located behind the output shaft axis 28, when the third suspension point S3 is located behind the axle shaft axis 28, and when the first and third suspension points S1 and S3 are located on the side opposite from the bevel wheel 16 with respect to the drive shaft axis 20 and the second suspension point S2 is located on the same side as the bevel wheel 16 with respect to the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (50) and (51) hold so as to further reduce the change in the angle of the drive shaft 18 with respect to the cardan shaft 32. It is to be noted, however, that the change in the angle of the drive shaft 18 with respect to the cardan shaft 32 is much smaller than in the conventional suspension structures even though the suspension points S1, S2 and S3 do not lie in a common plane containing the drive shaft axis 20 as long as Equations (50) and (51) hold approximately.

An additional suspension point may be provided along with the first, second and third suspension points S1, S2 and S3 to suspend the axle gear casing 10. In this case, Equations (50) and (51) hold approximately when the rigidity at the additional suspension point is smaller than the rigidities k1, k2 and k3 of the respective suspension points S1, S2 and S3.

Figure 11:
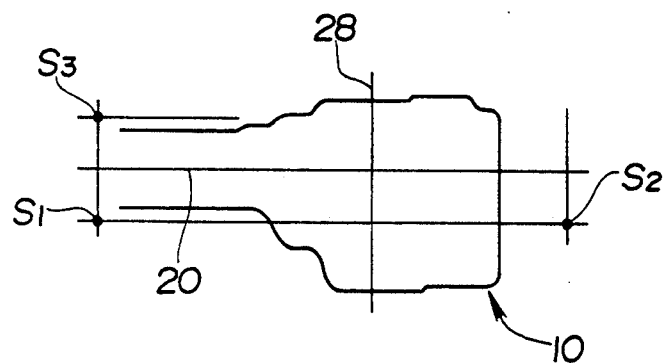
FIG. 11 is a schematic diagram used in explaining alternative positions of the first, second and third suspension points.

Referring to FIG. 11, there is illustrated a third embodiment of the final drive suspension system of the invention. In this embodiment, the locations of the first, second and third suspension points S1, S2 and S3 are selected to fulfill the conditions of e1=e and d2=0 which satisfy both of the fourth case (IV) of conditions and the sixth case (VI) of conditions. That is, the first suspension point S1 is located in front of the output shaft axis 28. The second suspension point S2 is located behind the output shaft axis 28. The third suspension point S3 is located in front of the output shaft axis 28. The first and second suspension points S1 and S2 are located on the same side as the bevel wheel 16 with respect to the drive shaft axis 20, whereas the third suspension point S3 is located on the side opposite from the bevel wheel 16 with respect to the drive shaft axis 20.

Substitution of e1=e and d2=0 into Equations (34) and (35) gives the following equations for the ratios of the rigidities k1, k2 and k3 at the respective suspension points S1, S2 and S3.

$$\frac{k3}{k1} = \left(1 - \frac{e}{e2}\right) \cdot \frac{d}{e \cdot \zeta2 - d} \tag{52}$$

-continued $$\frac{k3}{k2} = \left(1 - \frac{e}{e2}\right) \cdot \frac{-d}{e \cdot \zeta 2} \quad (53)$$

If the transverse distance e of the second suspension point S2 from the y coordinate axis, the transverse distance e2 of the drive shaft axis 20 from the y coordinate axis, the longitudinal distance d of the second and third suspension points S2 and S3 from the x coordinate axis, and the rigidities k1, k2 and k3 of the respective suspension points S1, S2 and S3 are selected to satisfy Equations (52) and (53), the rolling motion of the final drive unit caused by the cardan shaft moment (rolling torque TR) around the drive shaft axis 20 and the pitching motion of the final drive unit caused by the starting moment (pitching torque TP) around the output shaft axis 28 will be canceled on the drive shaft axis 20. Because of this, the drive shaft 18 is held in its horizontal position and no change occurs in the angle between the drive shaft 18 and the cardan shaft 34. This minimizes the vibrations and noises which may occur at the cardan joint 30. In this case, Equations (52) and (53) hold, for example, when e1/e=1, e2/e=½, e1/e2=2, d/e=5 and k1:k2:k3=1:5:5.

When d2>0, the distances e, e1, e2, d and d2 and the rigidities k1, k2 and k3 may be selected to fulfill the conditions of e1/e=1, e2/e=½, e1/e2=½, d2/e=⅗, d/e=5, and k1:k2:k3:=2:13:15.

Equations (52) and (53) hold approximately and substantially no change occurs in the angle of the drive shaft 18 with respect to the cardan shaft 34 as long as the rigidity k1 at the first suspension point S1 is smaller than the rigidities k2 and k3 at the second and third suspension points S2 and S3 when the first suspension point S1 is located in front of the output shaft axis 28, when the second suspension point S2 is located behind the output shaft axis 28, when the third suspension point S3 is located in front of the output shaft axis 28, and when the first and second suspension points S1 and S2 are located on the same side as the bevel wheel 16 with respect to the drive shaft axis 20, whereas the third suspension point S3 is located on the side opposite from the bevel wheel 16 with respect to the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (52) and (53) hold so as to further reduce the change in the angle of the drive shaft 18 with respect to the cardan shaft 34. It is to be noted, however, that the change in the angle of the drive shaft 18 with respect to the cardan shaft 34 is much smaller than in the conventional suspension structures even though the suspension points S1, S2 and S3 do not lie in a common plane containing the drive shaft axis 20 as long as Equations (52) and (53) hold approximately.

An additional suspension point may be provided along with the first, second and third suspension points S1, S2 and S3 to suspend the axle gear casing 10. In this case, Equations (52) and (53) hold approximately when the rigidity at the additional suspension point is smaller than the rigidities k1, k2 and k3 of the respective suspension points S1, S2 and S3.

Figure 12:
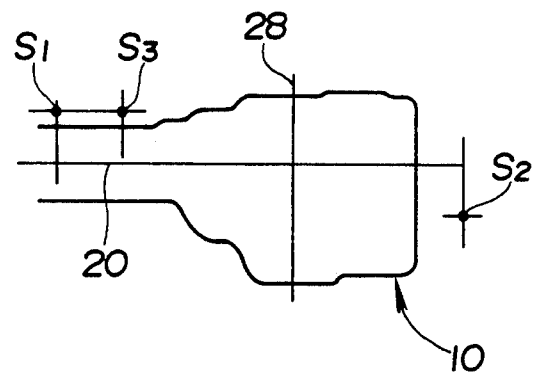
FIG. 12 is a schematic diagram used in explaining alternative positions of the first, second and third suspension points.

Referring to FIG. 12, there is illustrated a fourth embodiment of the final drive suspension system of the invention. In this embodiment, the locations of the first, second and third suspension points S1, S2 and S3 are selected to fulfill the condition of e1=0 which satisfies both of the first case (I) of conditions and the sixth case (VI) of conditions. That is, the first suspension point S1 is located in front of the output shaft axis 28. The second suspension point S2 is located behind the output shaft axis 28. The third suspension point S3 is located in front of the output shaft axis 28. The first and third suspension points S1 and S3 are located on the side opposite from the bevel wheel 16 with respect to the drive shaft axis 20 and the second suspension point S2 is located as the same side as the bevel wheel 16 with respect to the drive shaft axis 20.

Substitution of e1=0 into Equations (48) and (49) gives the following equations for the ratios of the rigidities k1, k2 and k3 at the respective suspension points S1, S2 and S3.

$$\frac{k3}{k1} = \frac{-\zeta 2 + d/e}{\zeta 2 + d2/e - d/e} \quad (54)$$

$$\frac{k3}{k2} = \left(1 - \frac{e}{e2}\right) \cdot \frac{\zeta 2 - d/e}{d2/e}$$

$$= \left(1 - \frac{e}{e2}\right) \cdot \frac{\zeta 2 \cdot e - d}{d2} \quad (55)$$

If the transverse distance e of the second suspension point S2 from the y coordinate axis, the transverse distance e2 of the drive shaft axis 20 from the y coordinate axis, the longitudinal distance d of the second and third suspension points S2 and S3 from the x coordinate axis, the longitudinal distance d2 of the third suspension point S3 from the x coordinate axis, and the rigidities k1, k2 and k3 of the respective suspension points S1, S2 and S3 are selected to satisfy Equations (54) and (55), the rolling motion of the final drive unit caused by the cardan shaft moment (rolling torque TR) around the drive shaft axis 20 and the pitching motion of the final drive unit caused by the starting moment (pitching torque TP) around the output shaft axis 28 will be canceled on the drive shaft axis 20. Because of this, the drive shaft 18 is held in its horizontal position and no change occurs in the angle between the drive shaft 18 and the cardan shaft 34. This minimizes the vibrations and noises which may occur at the cardan joint 30. In this case, Equations (54) and (55) hold, for example, when e2/e=½, d2/e=⅔, d/e=13/3 and k1:k2:k3=1:2:1. It is to be noted that Equations (54) and (55) hold also when e1<0.

Equations (54) and (55) hold approximately and substantially no change occurs in the angle of the drive shaft 18 with respect to the cardan shaft 34 as long as the rigidities k1 and k3 at the first and third suspension points S1 and S3 are smaller than the rigidity k2 at the second suspension point S2 when the first suspension point S1 is located in front of the output shaft axis 28, when the second suspension point S2 is located behind the output shaft axis 28, when third suspension point S3 is located in front of the output shaft axis 28, and when the first and third suspension points S1 and S3 are located on the side opposite from the bevel wheel 16 with respect to the drive shaft axis 20 and the second suspension point S2 is located on the same side as the bevel wheel 16 with respect to the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (54) and (55) hold so as to further reduce the change in the angle of the drive shaft 18 with respect to the cardan shaft 34. It is to be noted, however, that the change in the angle of the drive shaft 18 with respect to the cardan shaft 34 is much smaller than in the conventional suspension structures even though the suspension points S1, S2 and S3 do not lie in a common plane containing the drive shaft axis 20 as long as Equations (54) and (55) hold approximately.

An additional suspension point may be provided along with the first, second and third suspension points S1, S2 and S3 to suspend the axle gear casing 10. In this case, Equations (54) and (55) hold approximately when the rigidity at the additional suspension point is smaller than the rigidities k1, k2 and k3 of the respective suspension points S1, S2 and S3.

What is claimed is:

1. A suspension system for suspending a final drive unit installed on an automotive vehicle comprising:
   road wheels;
   a cardan shaft;
   the final drive unit including a drive shaft drivingly coupled to the cardan shaft, and output shafts drivingly coupled to the respective road wheels for transmitting a drive from the cardan shaft to the road wheels, the drive shaft having an axis extending longitudinally of the vehicle, the output shafts having an axis extending transversely of the vehicle;
   the final drive unit being subject to reaction torques causing the final drive unit to make a rolling angular displacement around the drive shaft axis and reaction torques causing the final drive unit to make a pitching angular displacement around the output shaft axis during vehicle driving; and
   elastic suspension means for elastically flexibly suspending the final drive unit with respect to the vehicle at suspension points located at different positions to reduce the pitching angular displacement substantially to zero.

2. The suspension system as claimed in claim 1, wherein the suspension means have rigidities at the respective suspension points, the rigidities being determined in relation to the positions of the respective suspension points to reduce the pitching angular displacement substantially to zero.

3. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels; and
   elastic suspension means for elastically flexibly suspending the final drive unit, with respect to the vehicle, at first, second and third suspension points, the second suspension point being located behind the first suspension point and in an acute-angled zone made between a first resultant torque supporting plane and an axle plane, the first resultant torque supporting plane expanding through the first suspension point and normal to a resultant torque vector of the reaction torques around the drive shaft axis and the reaction torques around the output shaft axis, the axle plane expanding normal to the output shaft axis and including a rolling axis, the rolling axis extending between the first and second suspension points and parallel with the drive shaft axis, the third suspension point being located on a side opposite from the second suspension point with respect to the first resultant torque supporting plane and on the same side as the second suspension point with respect to the axle plane.

4. The suspension system as claimed in claim 3, wherein the rolling axis is in alignment with the dive shaft axis.

5. The suspension system as claimed in claim 3, wherein the elastic suspension means has rigidities k1, k2 and k3 at the first, second and third suspension points, respectively, the rigidities k1, k2 and k3 being determined by $$k1 : k2 : k3 = \frac{1}{X1 \cdot l31 \cdot l12} : \frac{1}{X2 \cdot l12 \cdot l23} : \frac{1}{X3 \cdot l23 \cdot l31}$$

where X1 is a distance at which the first suspension point is spaced from the rolling axis in a direction of the width of the vehicle, X2 is a distance at which the second suspension point is spaced from the rolling axis in the direction of the width of the vehicle, X3 is a distance at which the third suspension point is spaced from the rolling axis in the direction of the width of the vehicle, 112 is a distance at which the first resultant torque supporting plane is spaced from a second resultant torque supporting plane expanding through the second suspension point and normal to the resultant torque vector, 123 is a distance at which the second resultant torque supporting plane is spaced from a third resultant torque supporting plane expanding through the third suspension point and normal to the resultant torque vector, and 131 is a distance at which the first resultant torque supporting plane is spaced from the third resultant torque supporting plane.

6. The suspension system as claimed in claim 5, wherein the rolling axis is in alignment with the drive shaft axis.

7. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels; and
   elastic suspension means for elastically flexibly suspending the final drive unit, with respect to the vehicle, at first, second and third suspension points, the second suspension point being located behind the first suspension point and in an acute-angled zone made between a first resultant torque supporting plane and an axle plane, the first resultant torque supporting plane expanding through the first suspension point and normal to a resultant torque vector of the reaction torques around the drive shaft axis and the reaction torques around the output shaft axis, the axle plane expanding normal to the output shaft axis and including a rolling axis, the rolling axis extending between the first and second suspension points and parallel with the drive shaft axis, the third suspension point being located on a side opposite from the first suspension point with respect to a second resultant torque supporting plane and on the same side as the first suspension point with respect to the axle plane, the second resultant torque supporting plane expanding through the second suspension point and normal to the resultant torque vector.

8. The suspension system as claimed in claim 7, wherein the rolling axis is in alignment with the dive shaft axis.

9. The suspension system as claimed in claim 7, wherein the elastic suspension means has rigidities k1, k2 and k3 at the first, second and third suspension points, respectively, the rigidities k1, k2 and k3 being determined by $$k1 : k2 : k3 = \frac{1}{X1 \cdot l31 \cdot l12} : \frac{1}{X2 \cdot l12 \cdot l23} : \frac{1}{X3 \cdot l23 \cdot l31}$$

where X1 is a distance at which the first suspension point is spaced from the rolling axis in a direction of the width of the vehicle, X2 is a distance at which the second suspension point is spaced from the rolling axis in the direction of the width of the vehicle, X3 is a distance at which the third suspension point is spaced from the rolling axis in the direction of the width of the vehicle, l12 is a distance at which the first resultant torque supporting plane is spaced from the second resultant torque supporting plane, l23 is a distance at which the second resultant torque supporting plane is spaced from a third resultant torque supporting plane expanding through the third suspension point and normal to the resultant torque vector, and l31 is a distance at which the first resultant torque supporting plane is spaced from the third resultant torque supporting plane.

10. The suspension system as claimed in claim 9, wherein the rolling axis is in alignment with the drive shaft axis.

11. A suspension system for suspending a final drive unit installed on an automotive vehicle comprising:
road wheels;
a cardan shaft;
the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and
elastic suspension means for elastically flexibly suspending the final drive unit, with respect to the vehicle, at first, second and third suspension points, the first suspension point being located in front of the output shaft axis, the second suspension point being located behind the output shaft axis, the third suspension point being located on a side opposite from the bevel wheel with respect to the drive shaft axis, the second suspension point being located on the same side as the bevel wheel with respect to the drive shaft axis, the elastic suspension means having rigidities k1, k2 and k3 at the first, second and third suspension points, respectively, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta2 + \zeta2 \cdot e1/e + d/e}{\zeta2 + d2/e - d/e}$$

$$\frac{k3}{k2} = \left(1 - \frac{e}{e2}\right) \cdot \frac{\zeta2 - \zeta2 \cdot e1/e - d/e}{\zeta2 \cdot e1/e + d2/e}$$

where $\zeta2$ is a ratio TP/TR of the reaction torque TP around the output shaft axis to the reaction torque TR around the drive shaft axis.

12. The suspension system as claimed in claim 11, wherein the first, second and third suspension points lie in a common plane including the drive shaft axis.

13. A suspension system for suspending a final drive unit installed on an automotive vehicle comprising:
road wheels;
a cardan shaft;
the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels;
elastic suspension means for elastically flexibly suspending the final drive unit, with respect to the vehicle, at first, second and third suspension points, the first suspension point being located in front of the output shaft axis, the second and third suspension points being located behind the output shaft axis, the first and third suspension points being located on a side opposite from the bevel wheel with respect to the drive shaft axis, the second suspension point being located on the same side as the bevel wheel with respect to the drive shaft axis, the elastic suspension means having rigidities k1, k2 and k3 at first, second and third suspension points, respectively, the rigidity k3 being less than the rigidities k1 and k2; and the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta 2 + \zeta 2 \cdot e1/e + d/e}{\zeta 2 + d2/e - d/e}$$

$$\frac{k3}{k2} = \left(1 - \frac{e}{e2}\right) \cdot \frac{\zeta 2 - \zeta 2 \cdot e1/e - d/e}{\zeta 2 \cdot e1/e + d2/e}$$

where $\zeta 2$ is a ratio TP/TR of the reaction torque TP around the output shaft axis to the reaction torque TR around the drive shaft axis.

14. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion intergral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for transmitting a drive from the cardan shaft to the road wheels;
   elastic suspension means for elastically flexibly suspending the final drive unit, with respect to the vehicle, at first, second and third suspension points, the first suspension point being located in front of the output shaft axis, the second and third suspension points being located behind the output shaft axis, the first and third suspension points being located on a side opposite from the bevel wheel with respect to the drive shaft axis, the second suspension point being located on the same side as the bevel wheel with respect to the drive shaft axis, the elastic suspension means having rigidities k1, k2 and k3 at first, second and third suspension points, respectively, the rigidity k3 being less than the rigidities k1 and k2;
   the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta 2 + \zeta 2 \cdot e1/e + d/e}{\zeta 2 + d2/e - d/e}$$

$$\frac{k3}{k2} = \left(1 - \frac{e}{e2}\right) \cdot \frac{\zeta 2 - \zeta 2 \cdot e1/e - d/e}{\zeta 2 \cdot e1/e + d2/e}$$

where $\zeta 2$ is a ratio TP/TR of the reaction torque TP around the output shaft axis to the reaction torque TR around the drive shaft axis; and wherein the first, second and third suspension points lie in a common plane including the drive shaft axis.

15. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and
   elastic suspension means for elastically flexibly suspending the final drive unit, with respect to the vehicle, at first, second and third suspension points, the first and third suspension points being located in front of the output shaft axis, the second suspension point being located behind the output shaft axis, the third suspension point being located on a side opposite from the bevel wheel with respect to the drive shaft axis, the first and second suspension points being located on the same side as the bevel wheel with respect to the drive shaft axis, the elastic suspension means having rigidities k1, k2 and k3 at first, second and third suspension points, respectively, the rigidity k1 being less than the rigidities k2 and k3.

16. The suspension system as claimed in claim 15, wherein the first, second and third suspension points lie in a common plane including the drive shaft axis.

17. The suspension system as claimed in claim 15, wherein the elastic suspension means has rigidities k1, k2 and k3 at the first, second and third suspension points, respectively, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta 2 + \zeta 2 \cdot e1/e + d/e}{\zeta 2 + d2/e - d/e}$$

$$\frac{k3}{k2} = \left(1 - \frac{e}{e2}\right) \cdot \frac{\zeta 2 - \zeta 2 \cdot e1/e - d/e}{\zeta 2 \cdot e1/e + d2/e}$$

where $\zeta_2$ is a ratio TP/TR of the reaction torque TP around the output shaft axis to the reaction torque TR around the drive shaft axis.

18. The suspension system as claimed in claim 17, wherein the first, second and third suspension points lie in a common plane including the drive shaft axis.

19. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for the transmitting a drive from the cardan shaft to the road wheels; and
   elastic suspension means for elastically flexibly suspending the final drive unit, with respect to the vehicle, at first, second and third suspension points, the first and third suspension points being located in front of the output shaft axis, the second suspension point being located behind the output shaft axis, the first and third suspension points being located on a side opposite from the bevel wheel with respect to the drive shaft axis, the second suspension point being located on the same side as the bevel wheel with respect to the drive shaft axis, a transverse distance between the first and third suspension points being zero, the elastic suspension means having rigidities k1, k2 and k3 at first, second and third suspension points, respectively, the rigidities k1 and k3 being less than the rigidity k2.

20. The suspension system as claimed in claim 19, wherein the first, second and third suspension points lie in a common plane including the drive shaft axis.

21. The suspension system as claimed in claim 19, wherein the elastic suspension means has rigidities k1, k2 and k3 at the first, second and third suspension points, respectively, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta_2 + \zeta_2 \cdot e1/e + d/e}{\zeta_2 + d2/e - d/e}$$

$$\frac{k3}{k2} = \left(1 - \frac{e}{e2}\right) \cdot \frac{\zeta_2 - \zeta_2 \cdot e1/e - d/e}{\zeta_2 \cdot e1/e + d2/e}$$

where $\zeta_2$ is a ratio TP/TR of the reaction torque TP around the output shaft axis to the reaction torque TR around the drive shaft axis.

22. The suspension system as claimed in claim 21, wherein the first, second and third suspension points lie in a common plane including the drive shaft axis.

23. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and
   elastic suspension means for elastically flexibly suspending the final drive unit, with respect to the vehicle, at first, second and third suspension points, the first suspension point being located in front of the output shaft axis, the second suspension point being located behind the output shaft axis, the third suspension point being located on a side opposite from the bevel wheel with respect to the drive shaft axis, the second suspension point being located on the same side as the bevel wheel with respect to the drive shaft axis, the elastic suspension means having rigidities k1, k2 and k3 at the first, second and third suspension points, respectively, the final drive unit having a reduction ratio of $\zeta$, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

24. The suspension system as claimed in claim 23, wherein the first, second and third suspension points lie in a common plane including the drive shaft axis.

25. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and elastic suspension means for elastically flexibly suspending the final drive unit, with respect to the vehicle, at first, second and third suspension points, the first suspension point being located in front of the output shaft axis, the second and third suspension points being located behind the output shaft axis, the first and third suspension points being located on a side opposite from the bevel wheel with respect to the drive shaft axis, the second suspension point being located on the same side as the bevel wheel with respect to the drive shaft axis, the elastic suspension means having rigidities k1, k2 and k3 at first, second and third suspension points, respectively, the final drive unit having a reduction ratio of $\zeta$, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

26. The suspension system as claimed in claim 25, wherein the first, second and third suspension points lie in a common plane including the drive shaft axis.

27. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and
   elastic suspension means for elastically flexibly suspending the final drive unit, with respect to the vehicle, at first, second and third suspension points, the first and third suspension points being located in front of the output shaft axis, the second suspension point being located behind the output shaft axis, the third suspension point being located on a side opposite from the bevel wheel with respect to the drive shaft axis, the first and second suspension points being located on the same side as the bevel wheel with respect to the drive shaft axis, the elastic suspension means having rigidities k1, k2 and k3 at first, second and third suspension points, respectively, the final drive unit having a reduction ratio of $\zeta$, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta + \zeta \cdot e1/e + d/e}{\zeta + d2/e - d/e}$$

$$\frac{k3}{k2} = \left(1 - \frac{e}{e2}\right) \cdot \frac{\zeta - \zeta \cdot e1/e - d/e}{\zeta \cdot e1/e + d2/e}$$

28. The suspension system as claimed in claim 27 wherein the first, second and third suspension points lie in a common plane including the drive shaft axis.

29. A suspension system for suspending a final drive unit installed on an automotive vehicle comprising:
   road wheels;
   a cardan shaft;
   the final drive unit including a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, output shafts having an axis extending transversely of the vehicle, the output shafts being drivingly coupled to the bevel wheel and also to the respective road wheels for for transmitting a drive from the cardan shaft to the road wheels; and
   elastic suspension means for elastically flexibly suspending the final drive unit, with respect to the vehicle, at first, second and third suspension points, the first and third suspension points being located in front of the output shaft axis, the second suspension point being located behind the output shaft axis, the first and third suspension points being located on a side opposite from the bevel wheel with respect to the drive shaft axis, the second suspension point being located on the same side as the bevel wheel with respect to the drive shaft axis, a transverse distance between the first and third suspension points being zero, the elastic suspension means having rigidities k1, k2 and k3 at first, second and third suspension points, respectively, the final drive unit having a reduction ratio of $\zeta$, the first suspension point being located at a transverse distance of e1 from the third suspension point, the third suspension point being located at a transverse distance e2 from the drive shaft axis, the second suspension point being located at a transverse distance e from the third suspension point, the first suspension point being located at a longitudinal distance d from the second suspension point, the first suspension point being located at a longitudinal distance d2 from the third suspension point, the rigidities k1, k2 and k3 being determined by $$\frac{k3}{k1} = \left(1 - \frac{e1}{e2}\right) \cdot \frac{-\zeta + \zeta \cdot e1/e + d/e}{\zeta + d2/e - d/e}$$

-continued $$\frac{k3}{k2} = \left(1 - \frac{e}{e2}\right) \cdot \frac{\zeta - \zeta \cdot e1/e - d/e}{\zeta \cdot e1/e + d2/e}$$

30. The suspension system as claimed in claim 29, wherein the first, second and third suspension points lie in a common plane including the drive shaft axis.

* * * * *